(12) United States Patent
Sampigethaya et al.

(10) Patent No.: US 10,102,687 B1
(45) Date of Patent: Oct. 16, 2018

(54) INFORMATION MANAGEMENT SYSTEM FOR GROUND VEHICLES

(75) Inventors: Radhakrishna G. Sampigethaya, Bellevue, WA (US); Walter R. Beck, Salkum, WA (US); Kristine Kay Lane, Duvall, WA (US); Radha Poovendran, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1053 days.

(21) Appl. No.: 12/857,740

(22) Filed: Aug. 17, 2010

(51) Int. Cl.
*G05D 1/00* (2006.01)
*G07C 5/00* (2006.01)

(52) U.S. Cl.
CPC .................. *G07C 5/008* (2013.01)

(58) Field of Classification Search
None
See application file for complete search history.

(56) References Cited

U.S. PATENT DOCUMENTS

| | | | |
|---|---|---|---|
| 3,748,597 A | 7/1973 | Reinhart | |
| 4,216,168 A | 8/1980 | Evans et al. | |
| 6,044,323 A | 3/2000 | Yee et al. | |
| 6,047,165 A | 4/2000 | Wright | |
| 6,085,067 A | 7/2000 | Gallagher et al. | |
| 6,173,230 B1 | 1/2001 | Camus et al. | |
| 6,181,992 B1 | 1/2001 | Gurne et al. | |
| 6,313,759 B1 | 11/2001 | Musland-Sipper | |
| 6,385,513 B1 | 5/2002 | Murray et al. | |
| 6,438,468 B1 | 8/2002 | Muxlow et al. | |
| 6,529,706 B1 | 3/2003 | Mitchell | |
| 6,567,040 B1 | 5/2003 | Sevaston | |
| 6,671,589 B2 | 12/2003 | Holst et al. | |
| 6,675,382 B1 | 1/2004 | Foster | |
| 6,732,031 B1* | 5/2004 | Lightner et al. | ............. 701/31.4 |
| 6,741,841 B1 | 5/2004 | Mitchell | |

(Continued)

FOREIGN PATENT DOCUMENTS

| WO | 2009070655 | 6/2009 |
|---|---|---|
| WO | 2009082592 | 7/2009 |

OTHER PUBLICATIONS

USPTO Notice of Allowance dated Oct. 3, 2011 for U.S. Appl. No. 12/276,578.

(Continued)

*Primary Examiner* — Ramsey Refai
(74) *Attorney, Agent, or Firm* — Yee & Associates, P.C.

(57) ABSTRACT

A method and apparatus for managing software components and information. An apparatus comprises a computer system, a library application running on the computer system, a distribution application running on the computer system, and a crate tool in the computer system. The library application is configured to store a number of software components and information for ground vehicles in the computer system and generate tasks to manage software components and the information in the ground vehicles. The distribution application is configured to send a selected software component in the number of software components to a ground vehicle and receive the information from the ground vehicle. The crate tool is configured to manage crates containing the software components and the information and validate signatures associated with the software components and the information in the crates.

21 Claims, 13 Drawing Sheets

(56) References Cited

U.S. PATENT DOCUMENTS

| | | | |
|---|---|---|---|
| 6,748,597 B1 | 6/2004 | Frisco et al. | |
| 6,760,778 B1 | 7/2004 | Nelson | |
| 6,795,758 B2 | 9/2004 | Sinex | |
| 6,816,728 B2 | 11/2004 | Igloi et al. | |
| 6,816,762 B2 | 11/2004 | Hensey et al. | |
| 6,831,912 B1 | 12/2004 | Sherman | |
| 6,898,492 B2 | 5/2005 | de Leon et al. | |
| 7,103,317 B2 | 9/2006 | Chang et al. | |
| 7,113,851 B1 | 9/2006 | Gelon et al. | |
| 7,133,767 B2 * | 11/2006 | Ogino et al. | 701/400 |
| 7,151,985 B2 | 12/2006 | Tripmaker | |
| 7,167,704 B2 | 1/2007 | Chang et al. | |
| 7,194,620 B1 | 3/2007 | Hayes | |
| 7,203,596 B2 | 4/2007 | Ledingham et al. | |
| 7,219,339 B1 | 5/2007 | Goyal et al. | |
| 7,230,221 B2 | 6/2007 | Busse et al. | |
| 7,292,579 B2 | 11/2007 | Morris | |
| 7,313,143 B1 | 12/2007 | Bruno | |
| 7,346,435 B2 * | 3/2008 | Amendola et al. | 701/1 |
| 7,356,389 B2 | 4/2008 | Holst et al. | |
| 7,366,589 B2 * | 4/2008 | Habermas | 701/1 |
| 7,412,291 B2 | 8/2008 | Judd et al. | |
| 7,420,476 B2 | 9/2008 | Stiffler | |
| 7,437,715 B2 | 10/2008 | Chatsinchai et al. | |
| 7,478,381 B2 | 1/2009 | Roberts et al. | |
| 7,502,672 B1 | 3/2009 | Kolls | |
| 7,506,309 B2 * | 3/2009 | Schaefer | 717/120 |
| 7,516,168 B2 | 4/2009 | LeCrone et al. | |
| 7,555,657 B2 | 6/2009 | Nasu | |
| 7,599,691 B1 | 10/2009 | Mitchell | |
| 7,636,568 B2 | 12/2009 | Gould et al. | |
| 7,653,212 B2 | 1/2010 | Haughawout et al. | |
| 7,703,145 B2 | 4/2010 | Stelling et al. | |
| 7,720,975 B2 | 5/2010 | Erickson | |
| 7,734,740 B2 | 6/2010 | To | |
| 7,747,531 B2 | 6/2010 | Cronce | |
| 7,756,145 B2 | 7/2010 | Kettering et al. | |
| 7,856,631 B2 | 12/2010 | Brodkorb et al. | |
| 7,876,259 B2 | 1/2011 | Schuchman | |
| 7,904,608 B2 | 3/2011 | Price | |
| 7,908,042 B2 | 3/2011 | Brinkley et al. | |
| 7,974,939 B2 | 7/2011 | Nanjangud Bhaskar et al. | |
| 8,027,758 B2 | 9/2011 | Ferro et al. | |
| 8,055,396 B2 | 11/2011 | Yates et al. | |
| 8,074,214 B2 | 12/2011 | Isaacson et al. | |
| 8,090,525 B2 | 1/2012 | Villiers | |
| 8,091,858 B2 | 1/2012 | Janich et al. | |
| 8,165,930 B2 | 4/2012 | Harnish et al. | |
| 8,176,520 B1 | 5/2012 | Mitchell | |
| 8,185,254 B2 | 5/2012 | Brinkman | |
| 8,185,609 B2 | 5/2012 | Fuchs et al. | |
| 8,442,751 B2 * | 5/2013 | Kimberly et al. | 701/120 |
| 2001/0056316 A1 | 12/2001 | Johnson et al. | |
| 2002/0035416 A1 | 3/2002 | De Leon | |
| 2002/0098853 A1 | 7/2002 | Chrumka | |
| 2002/0111720 A1 | 8/2002 | Holst et al. | |
| 2002/0163418 A1 | 11/2002 | Nemoto | |
| 2003/0003872 A1 | 1/2003 | Brinkley et al. | |
| 2003/0041155 A1 | 2/2003 | Nelson et al. | |
| 2003/0109973 A1 | 6/2003 | Hensey et al. | |
| 2003/0117295 A1 | 6/2003 | Okada | |
| 2003/0149670 A1 | 8/2003 | Cronce | |
| 2003/0188303 A1 | 10/2003 | Barman et al. | |
| 2003/0191559 A1 | 10/2003 | Chatsinchai et al. | |
| 2003/0191773 A1 | 10/2003 | Alexander | |
| 2003/0200026 A1 | 10/2003 | Pearson | |
| 2003/0203734 A1 | 10/2003 | Igloi et al. | |
| 2003/0225492 A1 | 12/2003 | Cope et al. | |
| 2003/0233178 A1 | 12/2003 | Sinex | |
| 2004/0049609 A1 | 3/2004 | Simonson et al. | |
| 2004/0106404 A1 | 6/2004 | Gould et al. | |
| 2004/0128326 A1 | 7/2004 | LeCrone et al. | |
| 2004/0243994 A1 | 12/2004 | Nasu | |
| 2005/0065670 A1 | 3/2005 | Tripmaker | |
| 2005/0071385 A1 | 3/2005 | Rao | |
| 2005/0094666 A1 | 5/2005 | Biyens | |
| 2005/0228558 A1 | 10/2005 | Vallette et al. | |
| 2005/0235340 A1 | 10/2005 | To | |
| 2005/0268111 A1 | 12/2005 | Markham | |
| 2005/0286452 A1 | 12/2005 | Hardgrave et al. | |
| 2006/0010438 A1 | 1/2006 | Brady et al. | |
| 2006/0156053 A1 | 7/2006 | Judd et al. | |
| 2006/0164261 A1 | 7/2006 | Stiffler | |
| 2006/0229772 A1 | 10/2006 | McClary | |
| 2006/0245431 A1 | 11/2006 | Morris | |
| 2006/0265110 A1 | 11/2006 | Ferro et al. | |
| 2006/0284050 A1 | 12/2006 | Busse et al. | |
| 2007/0027589 A1 | 2/2007 | Brinkley et al. | |
| 2007/0112479 A1 | 5/2007 | Wright et al. | |
| 2007/0114280 A1 | 5/2007 | Coop et al. | |
| 2007/0121641 A1 | 5/2007 | Hovey | |
| 2007/0124345 A1 | 5/2007 | Heinz | |
| 2007/0126621 A1 | 7/2007 | Sandell et al. | |
| 2007/0183435 A1 | 8/2007 | Kettering et al. | |
| 2007/0198513 A1 | 8/2007 | Stelling et al. | |
| 2007/0279244 A1 | 12/2007 | Haughawout et al. | |
| 2008/0102854 A1 | 5/2008 | Yi | |
| 2008/0104686 A1 | 5/2008 | Erickson | |
| 2008/0140278 A1 | 6/2008 | Breed | |
| 2008/0151794 A1 | 6/2008 | Moilanen | |
| 2008/0208853 A1 | 8/2008 | Vismans et al. | |
| 2008/0245431 A1 | 10/2008 | Janich et al. | |
| 2009/0024312 A1 | 1/2009 | Brinkman | |
| 2009/0112873 A1 | 4/2009 | Nanjangud Bhaskar et al. | |
| 2009/0138385 A1 | 5/2009 | Harnish et al. | |
| 2009/0138516 A1 | 5/2009 | Young et al. | |
| 2009/0138517 A1 | 5/2009 | McLain et al. | |
| 2009/0138518 A1 | 5/2009 | Rodgers et al. | |
| 2009/0138871 A1 | 5/2009 | Kimberly et al. | |
| 2009/0138872 A1 | 5/2009 | Fuchs et al. | |
| 2009/0138873 A1 | 5/2009 | Beck et al. | |
| 2009/0138874 A1 | 5/2009 | Beck et al. | |
| 2010/0017578 A1 | 1/2010 | Mansson et al. | |
| 2013/0212569 A1 | 8/2013 | Young et al. | |
| 2013/0246574 A1 | 9/2013 | Kimberly et al. | |
| 2016/0112496 A1 | 4/2016 | Kimberly et al. | |

OTHER PUBLICATIONS

USPTO Office Action dated Nov. 16, 2011 for U.S. Appl. No. 12/277,174, 45 pages.

Appeal Brief filed Apr. 11, 2012 for U.S. Appl. No. 12/277,182, 32 pages.

USPTO Examiner's Answer to Appeal Brief dated Jun. 14, 2012 for U.S. Appl. No. 12/277,182, 22 pages.

USPTO Final Office Action dated Jan. 11, 2012 for U.S. Appl. No. 12/277,182, 22 pages.

USPTO Office Action dated Jun. 8, 2012 for U.S. Appl. No. 12/276,516, 30 pages.

USPTO Office Action dated Apr. 18, 2012 for U.S. Appl. No. 12/276,549, 33 pages.

Appeal Brief filed Feb. 6, 2012 for U.S. Appl. No. 12/276,577, 36 pages.

USPTO Examiner's Answer to Appeal Brief dated Mar. 30, 2012 for U.S. Appl. No. 12/276,577, 22 pages.

Reply Brief filed May 30, 2012 for U.S. Appl. No. 12/276,577, 14 pages.

USPTO Notice of Allowance dated Jan. 24, 2012 for U.S. Appl. No. 12/276,587, 10 pages.

USPTO Notice of Allowance dated Oct. 3, 2011 for U.S. Appl. No. 12/276,587, 16 pages.

USPTO Notice of Allowance dated Dec. 29, 2011 for U.S. Appl. No. 12/275,651, 15 pages.

De Boer et al., "Generic Remote Software Update for Vehicle ECUs Using a Telematics Device as a Gateway", Networked Vehicle, Advanced Microsystems for Automotive Applications 2005, May 2005, pp. 371-380.

PCT Search Report dated Jan. 26, 2009 regarding international application No. PCT/US08/84824, applicant The Boeing Company, 2 pages.

(56) References Cited

OTHER PUBLICATIONS

PCT Search Report dated May 22, 2009 regarding international application No. PCT/US08/84839, applicant The Boeing Company, 3 pages.
Hungarian Written Opinion dated Feb. 2, 2012 regarding application No. 201002236-6, applicant The Boeing Company, 10 pages.
Andelsbach et al., "Embedding Trust into Cars—Secure Software Delivery and Installation", Oct. 2005, Horst Gortz Institute for IT Security, Bochum, Germany, pp. 1-15.
Office Action dated Aug. 16, 2011 for U.S. Appl. No. 12/277,182.
Office Action dated Jun. 24, 2011 for U.S. Appl. No. 12/275,651.
Final Office Action dated Jun. 20, 2011 for U.S. Appl. No. 12/276,728.
Office Action dated Apr. 21, 2011 for U.S. Appl. No. 12/276,577.
Final Office Action dated Aug. 17, 2011 for U.S. Appl. No. 12/276,577.
USPTO office action for U.S. Appl. No. 12/276,587 dated Mar. 17, 2011.
USPTO office action for U.S. Appl. No. 12/277,182 dated Mar. 9, 2011.
USPTO office action for U.S. Appl. No. 12/276,728 dated Jan. 26, 2011.
Bhagavathula et al., "Efficient Data Storage Mechanisms for DAP," Proceedings of the 23rd Digital Avionics Systems Conference (DASC '04), Oct. 2004, 7 pages.
Final Office Action, dated Jul. 20, 2012, regarding U.S. Appl. No. 12/277,174, 29 pages.
Reply Brief, dated Aug. 14, 2012, regarding U.S. Appl. No. 12/277,182, 8 pages.
Notice of Allowance, dated Sep. 20, 2012, regarding U.S. Appl. No. 12/276,549, 18 pages.
Notice of Allowance, dated Nov. 27, 2012, regarding U.S. Appl. No. 12/276,516, 18 pages.
Kayton, "Avionics for Manned Spacecraft," IEEE Transactions on Aerospace and Electronic Systems, vol. 25, No. 6, Nov. 1989, pp. 786-827.
Office Action, dated Dec. 3, 2013, regarding U.S. Appl. No. 12/276,728, 40 pages.
Final Office Action, dated Mar. 21, 2014, regarding U.S. Appl. No. 12/276,728, 16 pages.
Notice of Allowance, dated Aug. 29, 2014, regarding U.S. Appl. No. 12/276,728, 5 pages.
Office Action, dated Jul. 18, 2014, regarding U.S. Appl. No. 13/803,728, 54 pages.
Arinc, "Optimization Requirements Document for the Meteorological Data Collection and Reporting System/Aircraft Meteorological Data Relay System," National Oceanic and Atmospheric Administration (NOAA), Mar. 2006, 17 pages.
Frew, "Flight Demonstrations of Self-directed Collaborative Navigation of Small Unmanned Aircraft," AIAA 3rd "Unmanned Unlimited" Technical Conference, Workshop and Exhibit, Sep. 20-23, 2004, 14 pages.
Notice of Allowance, dated Feb. 6, 2015, regarding U.S. Appl. No. 13/803,728, 16 pages.
Office Action, dated Dec. 22, 2014, regarding U.S. Appl. No. 13/892,371, 54 pages.
Meneguzzi et al. "Electronic contracting in aircraft aftercare: A case study," Proceedings of the 7th international joint conference on Autonomous agents and multiagent systems: industrial track, International Foundation for Autonomous Agents and Multiagent Systems, 2008, pp. 63-70.
Liou, "When the Software Goes Beyond its Requirements—A Software Security Perspective," Information Technology: New Generations (ITNG), 2012 Ninth International Conference on IEEE, 2012, pp. 403-408.
Werner et al., "Aeronautical Broiadband Communications Via Satellite", DLR Oberpfaffenhofen Institute of Communications and Navigation, Copyright 2001, 31 pages.
Lutz et al., "Development and Future Applications of Satellite Communications", Emerging Location Aware Broadband Wireless Ad Hoc Networks, Copyright 2005, pp. 2342-2346.
Office Action, dated Feb. 7, 2017, regarding U.S. Appl. No. 14/981,886, 42 pages.
Notice of Allowance, dated Jun. 28, 2017, regarding U.S. Appl. No. 14/981,886, 19 pages.
Notice of Allowance, dated Jul. 31, 2015, regarding U.S. Appl. No. 12/276,577, 8 pages.
Notice of Allowance, dated Aug. 17, 2015, regarding U.S. Appl. No. 13/892,371, 11 pages.
Office Action, dated May 13, 2015, regarding U.S. Appl. No. 13/892,371, 32 pages.

\* cited by examiner

INFORMATION MANAGEMENT SYSTEM FOR GROUND VEHICLES

BACKGROUND INFORMATION

1. Field

The present disclosure relates generally to ground vehicles and, in particular, to maintenance for automobiles. Still more particularly, the present disclosure relates to a method and apparatus for managing information in automobiles.

2. Background

Automobiles are becoming more and more complex. For example, carburetors have been replaced by electronic fuel injection systems. Brakes for automobiles now often have antilock brake systems. These antilock brake systems may prevent the wheels from locking during emergency braking or braking on different surfaces. Other examples include, for example, electronic stability control systems, air bag systems, traction control systems, navigation systems, climate control systems, and other types of systems.

These types of systems are often controlled, monitored, and/or implemented by computers in the automobiles. Further, these computers are becoming more and more powerful and interconnected to provide enhancements and new functionality in automobiles.

These and other functions in automobiles have resulted in an increase in the performance, as well as complexity, of the computers used in automobiles. Software running on the computers controls and monitors these different systems. As the complexity of these systems increases, the cost to develop and maintain the systems also increases. For example, about 30 percent of the cost of an automobile may be attributed to software used to control the engine and cabin of the automobile.

Currently, when maintenance is identified for an automobile, the maintenance is performed when the automobile is brought into a maintenance facility. Further, the automobile owner may bring the automobile in for normally scheduled maintenance. During this time, any other maintenance issues regarding software or other systems may also be checked and performed.

Additionally, in some cases, an automobile owner may bring an automobile into a maintenance provider before the scheduled maintenance. For example, the computer in an automobile may detect a problem and display a visual indicator on the dashboard for the automobile. When the indicator is displayed, the automobile owner may then contact the maintenance provider to schedule diagnosis and maintenance to take care of the issue.

Consequently, updates to software for an automobile and retrieval of automobile diagnostics data rely on the owner of the automobile bringing in the automobile to a maintenance facility. As a result, some maintenance may not be performed as quickly as desired. With the delay in maintenance, the performance of the automobile may not be as high as possible and/or the safety of the automobile may be compromised.

For example, an automobile may have a lower fuel efficiency level or a higher emission level than desired until a software update is performed for the corresponding computer in the automobile. As another example, an anti-lock brake may not have the stability desired until a software update is performed.

Therefore, it would be advantageous to have a method and apparatus that takes into account one or more of the issues discussed above, as well as possibly other issues.

SUMMARY

In one advantageous embodiment, an apparatus comprises a computer system, a library application running on the computer system, and a distribution application running on the computer system. The library application is configured to store a number of software components for ground vehicles in the computer system and generate tasks to manage software components in the ground vehicles. The distribution application is configured to send a selected software component in the number of software components to a ground vehicle.

In another advantageous embodiment, an apparatus comprises a computer system, a library application running on the computer system, a distribution application running on the computer system, and a crate tool in the computer system. The library application is configured to store a number of software components and information for ground vehicles in the computer system and generate tasks to manage software components and the information in the ground vehicles. The distribution application is configured to send a selected software component in the number of software components to a ground vehicle and receive the information from the ground vehicle. The crate tool is configured to manage crates containing the software components and the information and is configured to validate signatures associated with the software components and the information in the crates.

In yet another advantageous embodiment, a method is provided for managing software components for ground vehicles. A software component is received for a ground vehicle to form a received software component. The received software component is stored in a library with a plurality of software components. A user interface system is provided to manipulate the plurality of software components in the library. In response to receiving a request to send a selected software component from the plurality of software components in the library to a computer in the ground vehicle, a number of tasks associated with the selected software component to send to the computer in the ground vehicle is identified. The number of tasks and the selected software component are sent to a distribution application.

In still yet another advantageous embodiment, a method is provided for managing software components in ground vehicles. A number of software components are stored in a computer system having a library application and a distribution application. The library application is configured to store the number of software components for the ground vehicles in the computer system and generate tasks to manage software components in the ground vehicles. A number of tasks and a selected software component in the number of software components are sent to a ground vehicle using the distribution application.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims.

The advantageous embodiments, however, as well as a preferred mode of use, further objectives, and advantages thereof, will best be understood by reference to the following detailed description of an advantageous embodiment of the present disclosure when read in conjunction with the accompanying drawings, wherein.

DETAILED DESCRIPTION

Figure 1:
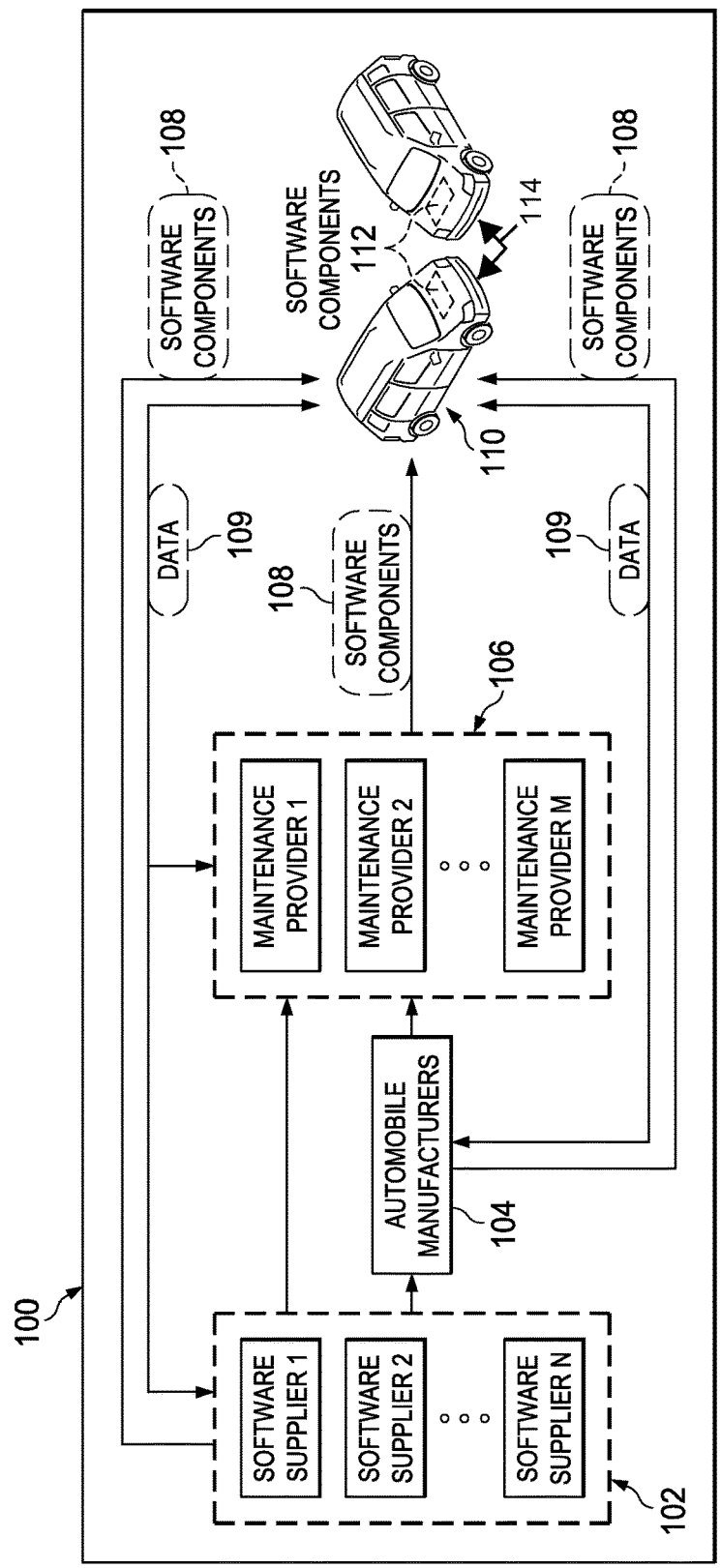
FIG. 1 is an illustration of an automobile information management environment in accordance with an advantageous embodiment.

The different advantageous embodiments recognize and take into account a number of considerations. For example, the different advantageous embodiments recognize and take into account that software components in ground vehicles may need updating. Further, the different advantageous embodiments recognize and take into account that data may need to be retrieved from the ground vehicles to perform, for example, maintenance and/or diagnostics tests. Ground vehicles may take the form of, for example, without limitation, wheeled vehicles, tracked vehicles, vehicles with legs, automobiles, trucks, trains, vans, buses, and other suitable types of ground vehicles.

The different advantageous embodiments recognize and take into account that with the growing complexity of different systems for ground vehicles that are monitored and controlled by computers, updating software components for these ground vehicles may not occur as quickly as desired. Further, updating of software components for ground vehicles may be limited to scheduled maintenance periods. Thus, the different advantageous embodiments recognize and take into account that when software components are made available, the distribution of software components to automobiles should occur as quickly as possible.

The different advantageous embodiments recognize and take into account that the current distribution of software components typically occur at maintenance providers after automobiles have been sold. In some cases, automobile manufacturers and software suppliers may update software components to automobiles before delivery of automobiles for sale. The different advantageous embodiments recognize and take into account that with the growing complexity of computer systems used in ground vehicles, multiple sources may need to have the capability to directly distribute software components to the ground vehicles. Further, software components may need to be distributed to the ground vehicles through various paths of sources. Additionally, software components may need to be simultaneously distributed to more than one ground vehicle. For example, software components may need to be distributed to a group of ground vehicles selected based on factors, such as model and type.

The different advantageous embodiments also recognize and take into account that the currently used processes and structures for delivering software components to automobiles and retrieving information from automobiles may not have the security or error control as desired. For example, the different advantageous embodiments recognize and take into account that current systems for delivering software components to automobiles occur at maintenance providers. The maintenance providers receive these updates from the software suppliers or automobile manufacturers. The different advantageous embodiments recognize and take into account, however, that errors may occur in the transmission or copying of software components.

Additionally, the different advantageous embodiments also recognize and take into account that the desired level of security to prevent tampering or unauthorized changing of software components also may not be present in the currently available mechanisms used to distribute software to automobiles. Further, the desired level of security to prevent unauthorized access to the software components may not be present in the currently available mechanisms.

The different advantageous embodiments recognize and take into account that an owner of an automobile may initiate a process for receiving updates for software components but may not have the capability to install each update in the computer for the automobile. The different advantageous embodiments also recognize and take into account that the owner also cannot be expected to maintain the correct configurations for software in the automobile. The different advantageous embodiments also recognize and take into account that automobile owners also may not take their automobiles in for maintenance as scheduled or when requested.

Therefore, the different advantageous embodiments recognize and take into account that it would be desirable to have a more reliable and/or secure system for managing software components in ground vehicles, such as automobiles. Thus, the different advantageous embodiments provide a method and apparatus for managing information, such as software components and/or data, for ground vehicles.

In one advantageous embodiment, an apparatus comprises a computer system, a library application, and a distribution application. The library application and the distribution application run on the computer system. The library application is configured to store a number of software components for use in ground vehicles in the computer system. The library application is also configured to generate tasks to manage software components in ground vehicles. The distribution application is configured to send a selected software component in the number of software components in the library to a ground vehicle.

With reference now to FIG. 1, an illustration of an automobile information management environment is depicted in accordance with an advantageous embodiment. Automobile information management environment 100 is an example of one environment in which different advantageous embodiments may be implemented.

As depicted, automobile information management environment 100 includes software suppliers 102, automobile manufacturers 104, and maintenance providers 106. These different entities manage software components 108 and data 109 for automobiles 110 in accordance with an advantageous embodiment. The management of software components 108 and data 109 for automobiles 110 is performed through software suppliers 102, automobile manufacturers 104, and/or maintenance providers 106, in contrast to currently available software management systems. For example, currently, software component management is only performed through maintenance providers 106 and automobile manufacturers 104.

Software suppliers 102 are entities that supply software components 108. These software suppliers may be, for example, entities that create software to control vehicle systems, such as entertainment systems, navigation systems, electronic fuel injection systems, cabin control systems, electronic stability control systems, traction control systems, and/or other suitable types of systems. Software components 108 may include updates for software components 112 in automobiles 110.

In these illustrative examples, software suppliers 102 also receive data 109. Data 109 may include automobile performance information, automobile maintenance information, automobile diagnostics data, software, logs, files, reports, and/or other suitable types of information. In some illustrative examples, software suppliers 102 use data 109 to generate software components 108. Software suppliers 102 may request vehicle data 109 from automobiles 110.

Additionally, automobile manufacturers 104 may also generate software components 108 and/or receive data 109. Automobile manufacturers 104 may receive data 109 in response to requests sent to automobiles 110 for data 109.

Maintenance providers 106, in these examples, are entities to which automobiles 110 may typically be taken for maintenance. For example, maintenance providers 106 may be an automobile dealership or a specialized maintenance provider.

In the different illustrative examples, software components 108 may be delivered to automobiles 110 through a number of different paths. A number, when referring to items, means one or more items. For example, a number of paths is one or more paths.

For example, maintenance providers 106 and software suppliers 102 may install software components 108 in automobiles 110. Further, data 109 also may be delivered to at least one of software suppliers 102, automobile manufacturers 104, and maintenance providers 106 from automobiles 110 through a number of different paths.

As one illustrative example, automobiles 110 may send data 109 to maintenance providers 106. Maintenance providers 106 then may send data 109 to software suppliers 102. In another illustrative example, automobiles 110 may send data 109 to automobile manufacturers 104.

The different advantageous embodiments, however, also provide improvements to the delivery of software components and data through the use of an information management system. This system also decreases the possibility that errors in copying or transmission of the software components and/or data may occur. Further, this system also reduces the possibility that unauthorized changes and/or access to software components 108 and/or data 109 may occur.

Additionally, the different illustrative examples also provide a capability for software suppliers 102 and automobile manufacturers 104 to directly send software components 108 to automobiles 110 and directly receive data 109 from automobiles 110. As a result, automobiles 110 do not have to be taken to maintenance providers 106 for these updates.

In this manner, updates to software components 112 in automobiles 110 and/or retrieval of data 109 from automobiles 110 may be performed through a number of different paths. This type of system increases the speed at which software components 108 may be installed in automobiles 110 and data 109 obtained from automobiles 110. Further, the different advantageous embodiments include a system for sending software components 108 and receiving data 109 through wireless communication links with automobiles 110.

Figure 2:
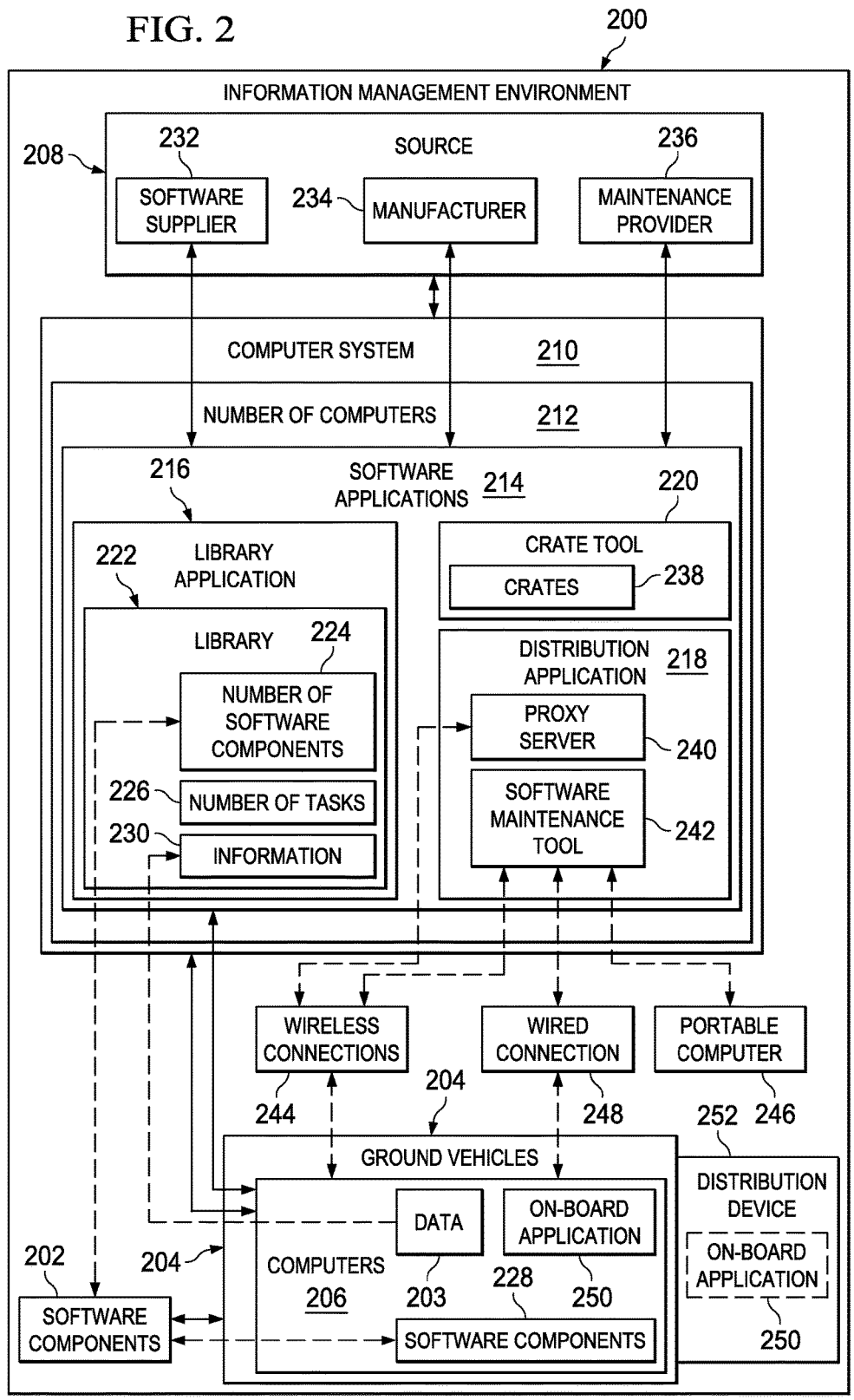
FIG. 2 is an illustration of an information management environment in accordance with an advantageous embodiment.

With reference now to FIG. 2, an illustration of an information management environment is depicted in accordance with an advantageous embodiment. Automobile information management environment 100 in FIG. 1 is an example of one implementation for information management environment 200 in FIG. 2.

Information management environment 200 may be used to manage software components 202 and data 203 for ground vehicles 204. As depicted, software components 202 may take a number of different forms. For example, without limitation, software components 202 may include a software program, a cache, a configuration file, an audio file, a database, and/or other suitable types of software that may be used in computers 206 in ground vehicles 204.

Further, data 203 also may take a number of different forms. For example, without limitation, data 203 may include performance information, maintenance information, health information, system diagnostics data, logs, files, reports, and/or other suitable forms of data.

In these illustrative examples, ground vehicles 204 may take a number of different forms. For example, without limitation, the types of vehicles in ground vehicles 204 may include at least one of wheeled vehicles, tracked vehicles, vehicles with legs, automobiles, trucks, trains, vans, buses, and other types of ground vehicles.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C.

In the illustrative examples, source 208 manages software components 202 and data 203 for ground vehicles 204. Source 208 may be a single entity or multiple entities. For example, source 208 may be at least one of a software supplier, a ground vehicle manufacturer, a maintenance provider, and other suitable entities. In other illustrative examples, source 208 may be an organization, such as a military or government organization, a service provider, a ground vehicle, or some other suitable type of source.

In these illustrative examples, source 208 manages software components 202 and data 203 using computer system 210. Computer system 210 includes number of computers 212 in these examples.

Software applications 214 run on number of computers 212 in computer system 210. Software applications 214 manage software components 202 and data 203. In these illustrative examples, software applications 214 include at least one of library application 216, distribution application 218, and crate tool 220.

Library application 216 manages library 222. More specifically, library application 216 is configured to store number of software components 224 in library 222. Library 222 is a repository for number of software components 224 and data 203.

Additionally, library application 216 is configured to generate number of tasks 226 to update software components 228 in ground vehicles 204. Library application 216 is also configured to generate number of tasks 226 to retrieve data 203 from computers 206 in ground vehicles 204. Number of tasks 226 is stored in library 222 until they are performed by one or more of software applications 214 running on computer system 210.

Number of tasks 226 may include tasks for installing software components, deleting software components, updating software components, retrieving data from ground vehicles 204, and/or other suitable operations.

Number of tasks 226 may take a number of different forms. For example, without limitation, number of tasks 226 may be a program, a script, a configuration file listing tasks to be performed, a number of commands, and/or other suitable forms.

In these illustrative examples, library 222 also may include information 230. Information 230 may be, for example, information used to generate number of tasks 226 in response to identifying different software components in number of software components 224. Information 230 may include data 203. For example, information 230 may include performance information, sensor data, hardware and/or software status information, and/or other suitable types of data 203 retrieved from ground vehicles 204. Additionally, information 230 may include descriptive information for ground vehicles 204 and/or source 208. Information 230 may also include an identification of which tasks in number of tasks 226 are for distributing number of software components 224.

Software components 228 may be received from at least one of software supplier 232, manufacturer 234, and maintenance provider 236. Each of these entities may include library application 216 to manage software components 202. For example, software supplier 232 may create software components and store the software components in a library. The library is managed using a library application at software supplier 232. Software supplier 232 may then send the software components to maintenance provider 236. Maintenance provider 236 also has a library application with a library to store software components.

In these illustrative examples, crate tool 220 manages the sending and receiving of software components 202 and data 203 within information management environment 200. Crate tool 220 prepares software components 202 and data 203 for movement between different software applications and entities. In particular, crate tool 220 packages software components 202 and/or data 203 into crates 238.

Crates 238 are data structures configured to move from one entity to another entity in a manner that provides a desired level of security and assurance that changes, accidental or unauthorized, have not occurred. For example, crate tool 220 is configured to sign software components, place software components in crates 238, view the contents in crates 238, remove software components from crates 238, validate signatures of crates 238, validate signatures of software components 202, and/or perform other suitable operations. Further, similar operations are performed by crate tool 220 when packaging data 203 into crates 238.

Distribution application 218 is configured to send number of software components 224 to computers 206 in ground vehicles 204. In these illustrative examples, distribution application 218 does not require any input from the owners of ground vehicles 204.

In these illustrative examples, distribution application 218 may take a number of different forms. For example, without limitation, distribution application 218 may be at least one of proxy server 240, software maintenance tool 242, and other suitable forms.

When distribution application 218 takes the form of proxy server 240, distribution application 218 may run on a computer in computer system 210 and distribute number of software components 224 to ground vehicles 204. In these depicted examples, proxy server 240 sends number of software components 224 to ground vehicles 204 using wireless connections 244. Further, the sending of number of software components 224 to ground vehicles 204 may occur without operator input. In other words, the sending of number of software components 224 may occur automatically.

In these illustrative examples, number of tasks 226 may include tasks performed by distribution application 218 in addition to tasks performed by computers 206 in ground vehicles 204. For example, number of tasks 226 may identify which ground vehicles in ground vehicles 204 are to receive number of software components 224.

When distribution application 218 takes the form of software maintenance tool 242, distribution application 218 runs on portable computer 246 in number of computers 212 in these illustrative examples. Software maintenance tool 242 may use wireless connections 244 or may be connected to a ground vehicle in ground vehicles 204 through wired connection 248.

In these illustrative examples, distribution application 218 communicates with on-board application 250. In particular, distribution application 218 may send a software component and one or more tasks to on-board application 250. On-board application 250 may be located in a number of different locations. For example, on-board application 250 may run on computers 206 in ground vehicles 204.

In other illustrative examples, on-board application 250 may be located in distribution device 252. Distribution device 252 is a hardware component separate from a computer in computers 206. Distribution device 252 may be integrated as part of a ground vehicle in ground vehicles 204 or may be in another location. For example, distribution device 252 may be in the garage of an owner of a ground vehicle, a maintenance location, or some other suitable location.

On-board application 250 is configured to receive software components 202 and send data 203. Additionally, on-board application 250 also may be configured to receive software components 202 in crates 238 and send data 203 in crates 238. In other words, on-board application 250 may include functions in crate tool 220. For example, on-board application 250 may place information to be returned to a maintenance provider or other entity in a crate.

The illustration of information management environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, additional automobiles in ground vehicles 204 may receive updates using software applications 214. Further, in some illustrative examples, automobiles may send crates with software components and/or tasks to other automobiles in ground vehicles 204. In still other illustrative examples, source 208 may receive software components and/or tasks from other automobiles. For example, two automobiles belonging to owners in the same family may be configured to exchange information, as indicated by arrow 114.

Figure 3:
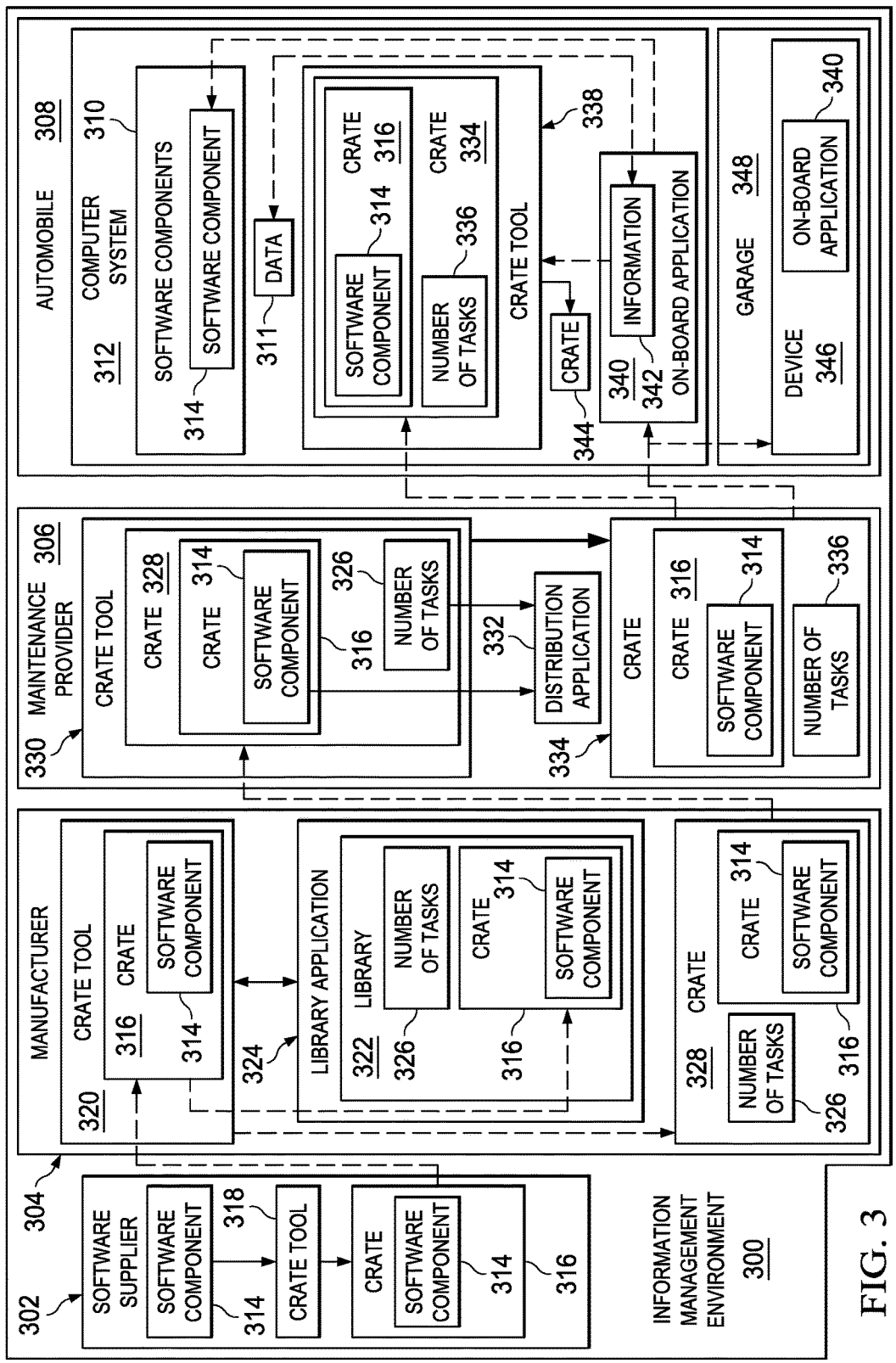
FIG. 3 is an illustration of a movement of software components in an information management environment in accordance with an advantageous embodiment.

With reference now to FIG. 3, an illustration of a movement of information in an information management environment is depicted in accordance with an advantageous embodiment. In this illustrative example, information management environment 300 is an example of one implementation for information management environment 200 in FIG. 2.

As depicted in this example, the different entities involved in managing software components and data include software supplier 302, manufacturer 304, and maintenance provider 306. These entities manage software components 310 and data 311 for automobile 308. Software components 310 run in computer system 312 in automobile 308. Data 311 is generated by computer system 312 in automobile 308.

In this illustrative example, software supplier 302 creates software component 314 for use in automobile 308. Software supplier 302 places software component 314 into crate 316 using crate tool 318. In turn, crate 316 is sent to manufacturer 304. Manufacturer 304 receives crate 316 and processes crate 316 using crate tool 320.

Crate tool 320 determines whether software component 314 is valid. For example, crate tool 320 may determine whether software component 314 actually originates from software supplier 302. A digital signature may be used for this determination. Additionally, crate tool 320 also ensures that no changes have been made to software component 314 during the transfer of crate 316 from crate tool 318 to crate tool 320. Crate 316 is placed into library 322 using library application 324.

In these examples, library application 324 generates number of tasks 326 for installing software component 314 in automobile 308. In these examples, crate tool 320 may place number of tasks 326 and software component 314 into crate 328.

In other illustrative examples, number of tasks 326 may be placed in a different crate from software component 314 or sent without using a crate. Additionally, in this example, software component 314 may still be in crate 316 when placed into crate 328. Crate 328 is then sent to maintenance provider 306.

Maintenance provider 306 processes crate 328 using crate tool 330. In some illustrative examples, maintenance provider 306 may have a library application similar to library application 324 for manufacturer 304. For example, maintenance provider 306 may have a library application that places the contents of crate 328 into a library. Number of tasks 326 and software component 314 are then processed using distribution application 332. Distribution application 332 may perform one or more of number of tasks 326. In addition, number of tasks 336 selected from number of tasks 326 also may be sent to automobile 308 for processing. Number of tasks 336 may be a portion or all of number of tasks 326, depending on the particular implementation. In these examples, crate tool 330 creates crate 334, which contains software component 314 in crate 316 and number of tasks 336.

For example, number of tasks 326 may identify automobiles that are to receive software components 310. This task is performed by distribution application 332. Number of tasks 326 also may include tasks that are performed by automobile 308. For example, number of tasks 326 also may include commands or scripts to be run on automobile 308 to send data 311 back to distribution application 332. Data 311 may include, without limitation, performance information, maintenance information, health information, system diagnostics data, logs, files, reports, and/or other suitable forms of data.

Distribution application 332 then sends crate 334 to automobile 308. Crate tool 338 and on-board application 340 running on computer system 312 in automobile 308 process crate 334 with number of tasks 336. In these illustrative examples, crate tool 338 verifies that software component 314 is valid.

In some illustrative examples, number of tasks 336 may be sent to automobile 308 without software component 314. For example, number of tasks 336 may include operations to remove a software component. This number of tasks may be sent to automobile 308 without a software component when no new software component or replacement software component is to be installed.

In these illustrative examples, on-board application 340 installs software component 314 in automobile 308 once crate tool 338 determines that software component 314 is valid. Further, computer system 312 performs number of tasks 336. Additionally, on-board application 340 may return information 342 in crate 344. Information 342 may include, for example, without limitation, a portion of data 311 generated by computer system 312, an indication of whether number of tasks 336 has been completed, and/or other suitable types of information. For example, information 342 may indicate whether number of tasks 336 has been performed without errors. If errors have occurred, information 342 contains an identification of the errors and the times at which the errors occurred. Crate 344 may then be returned to maintenance provider 306.

In these illustrative examples, software supplier 302 also may send crate 316 directly to maintenance provider 306. In addition, software supplier 302 and manufacturer 304 may distribute software component 314 directly to automobile 308. With this type of distribution, software supplier 302 also may include a library application and a distribution application. Manufacturer 304 may also have a distribution application.

As depicted, on-board application 340 is located in automobile 308. In other advantageous embodiments, on-board application 340 may be located in device 346. Device 346, in these illustrative examples, is located externally to automobile 308. For example, device 346 may be located in garage 348 or some other location where automobile 308 may be located when not being driven.

In these illustrative examples, the management of software components 310 is performed when automobile 308 is not being driven.

Figure 4:
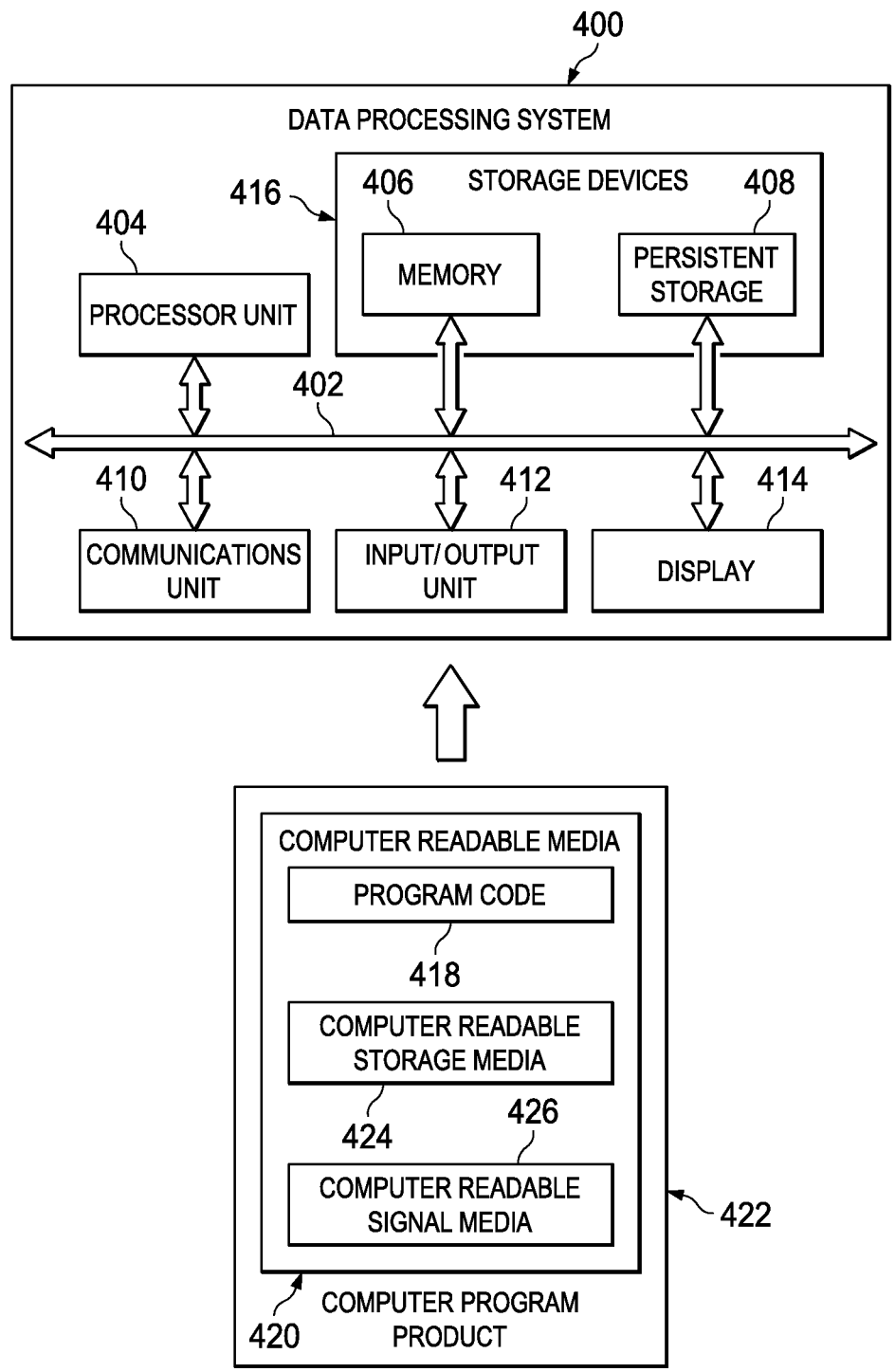
FIG. 4 is an illustration of a data processing system in accordance with an advantageous embodiment.

Turning now to FIG. 4, an illustration of a data processing system is depicted in accordance with an advantageous embodiment. Data processing system 400 is an example of a data processing system that may be used to implement number of computers 212 in computer system 210 in FIG. 2. Additionally, data processing system 400 also may be used to implement computers 206 in ground vehicles 204. As yet another example, data processing system 400 may be used to implement distribution device 252 in FIG. 2.

In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426.

Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these illustrative examples, computer readable storage media 424 is a non-transitory computer readable storage medium.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache, such as found in an interface and memory controller hub that may be present in communications fabric 402.

Figure 5:
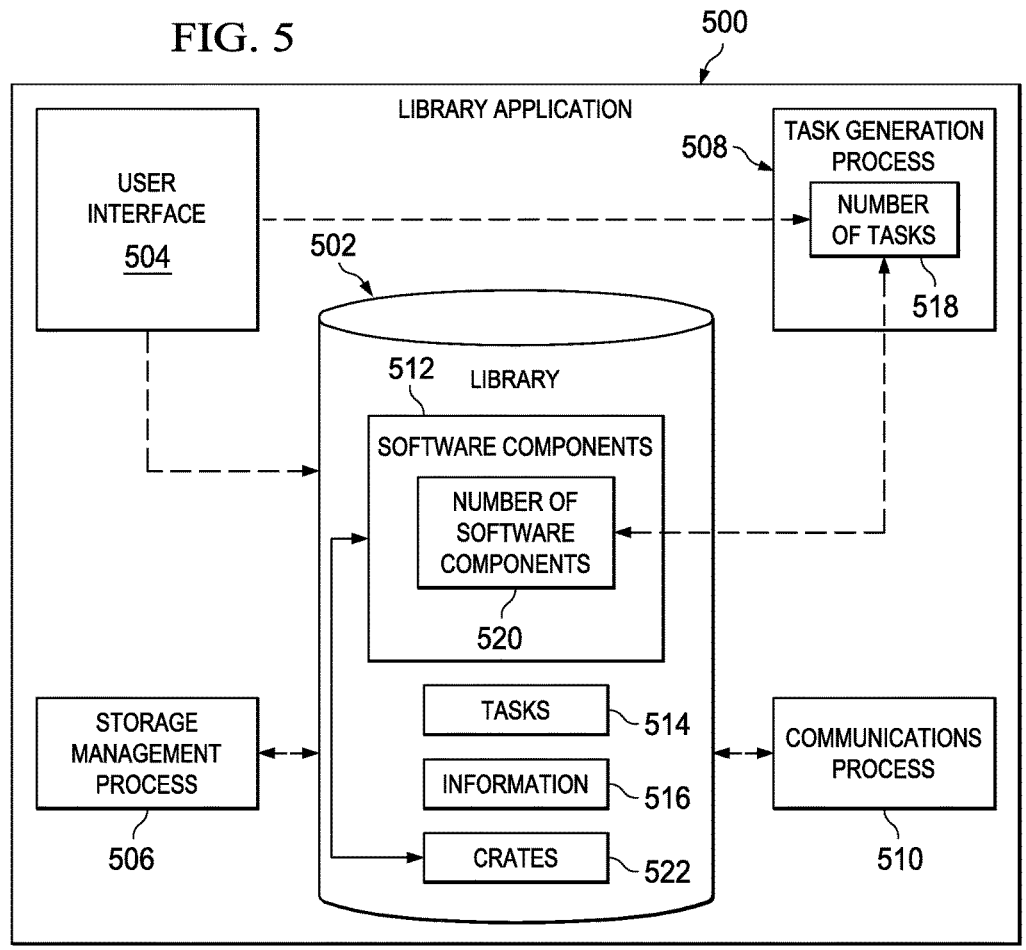
FIG. 5 is an illustration of a library application in accordance with an advantageous embodiment.

With reference now to FIG. 5, an illustration of a library application is depicted in accordance with an advantageous embodiment. Library application 500 is an example of one implementation for library application 216 in FIG. 2. Library application 500 manages library 502 in this example. Library 502 is an example of one implementation for library 222 in FIG. 2.

As depicted, library application 500 includes user interface 504, storage management process 506, task generation process 508, and communications process 510. Library 502 includes software components 512, tasks 514, and information 516. Information 516 may include data needed to perform tasks 514, information about the tasks completed by the computer in the ground vehicle, performance data, maintenance data, and/or other suitable types of information. For example, information 516 may include tire pressures, fuel pressures, an engine status, alerts, and/or other types of information.

User interface 504 provides an interface for an operator to interact with library application 500. Storage management process 506 provides an ability to manage software components 512 stored in library 502. Storage management process 506 also provides an ability to manage tasks 514 and information 516 stored in library 502.

Additionally, storage management process 506 provides an ability to identify software components 512 within library 502, add software components to library 502, remove software components from library 502, copy software components from library 502, and/or perform other suitable types of operations.

Task generation process 508 generates number of tasks 518 based on number of software components 520 selected from software components 512. Number of tasks 518 may be selected from tasks 514. In other illustrative examples, number of tasks 518 may be generated through user input received through user interface 504. This user input may be, for example, a selection of number of tasks 518 or a selection of number of software components 520 that may be associated with number of tasks 518. Further, number of tasks 518 may include tasks for retrieving data from a ground vehicle. For example, number of tasks 518 may specify types of data to be retrieved from the ground vehicle. Data received from the ground vehicle may be stored as information 516 in library 502.

In this illustrative example, communications process 510 is configured for library application 500 to send and receive content within library 502. For example, communications process 510 may communicate with a crate tool to receive a software component processed by the crate tool.

In other illustrative examples, communications process 510 may send number of tasks 518 and number of software components 520 to a crate tool for processing. Additionally, library application 500 may store software components 512 in crates 522. These crates may be generated by the crate tool or crated as received from a source.

Figure 6:
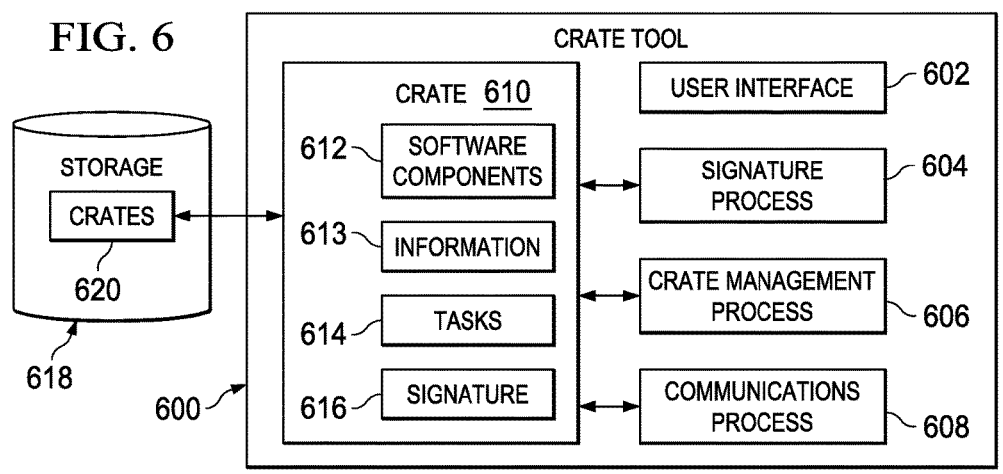
FIG. 6 is an illustration of a crate tool in accordance with an advantageous embodiment.

With reference now to FIG. 6, an illustration of a crate tool is depicted in accordance with an advantageous embodiment. Crate tool 600 is an example of one implementation for crate tool 220 in FIG. 2. In this illustrative example, crate tool 600 includes user interface 602, signature process 604, and communications process 608.

User interface 602 provides a user interface for an operator to operate crate tool 600. Crate tool 600 may be implemented in a data processing system, such as data processing system 400 in FIG. 4.

Signature process 604, in these illustrative examples, provides a number of different functions. For example, signature process 604 may apply a digital signature for crate 610. As another example, signature process 604 may be used to verify whether crate 610, with its contents, is valid. In other words, signature process 604 determines whether crate 610 should be used. A crate is valid if the software components, data, and other contents in the crate are identified as being from the source from which the crate is stated to be. Additionally, crate 610 also is valid if a determination is made that the contents of crate 610 have not been altered. In this example, crate 610 includes at least one of software components 612, information 613, tasks 614, and signature 616.

Signature process 604 may determine whether crate 610 is sent from the stated recipient based on signature 616. Additionally, signature 616 also may be used to determine whether changes to software components 612 and/or information 613 have occurred to crate 610. As one illustrative example, signature process 604 may use signature 616 to identify errors or determine that software components 612 have been altered since being signed with signature 616.

In these illustrative examples, signature 616 may be in a document separate from software components 612, information 613, and tasks 614. In other illustrative examples, signature 616 may be integral to software components 612, information 613, and/or tasks 614.

Crate management process 606 allows a user to remove one or more of software components 612 and tasks 614 from crate 610. Further, crate management process 606 allows a user to remove portions of information 613 from crate 610. Additionally, crate management process 606 allows the user to inspect or view software components 612, information 613, and tasks 614. As one illustrative example, crate management process 606 may allow a user to unpack one or more of software components 612 and tasks 614 from crate 610.

In these illustrative examples, crate 610 is a packaging system for information that is not a physical object. For example, crate 610 is a file that contains software components 612 and/or information 613. Crate 610 may be, for example, a zip file using a zip file format. A zip file format is a data compression and archival format in which the zip file may contain one or more files that have been compressed. Other examples of packaging systems for files include, for example, JAVA®, Archive (JAR) files. These files also may be encrypted or digitally signed, depending on the particular implementation.

Of course, any type of mechanism that provides a wrapper for information may be used. In these examples, the wrapper is a security wrapper that may be designed to meet various security requirements that may be set or required for the content within the crate.

Communications process 608 is used to receive or send crate 610. For example, communications process 608 may be used to send crate 610 to a library application.

With crate tool 600, a user may manipulate crates in a number of different ways. For example, crates may be organized, software components added to crates, software components removed from crates, and/or other suitable operations performed. Crate 610 may be stored in storage 618 with crates 620 in this illustrative example. Crates 620 may be organized by types of software components, types of information, types of vehicles, manufacturers, and/or other suitable factors.

Figure 7:
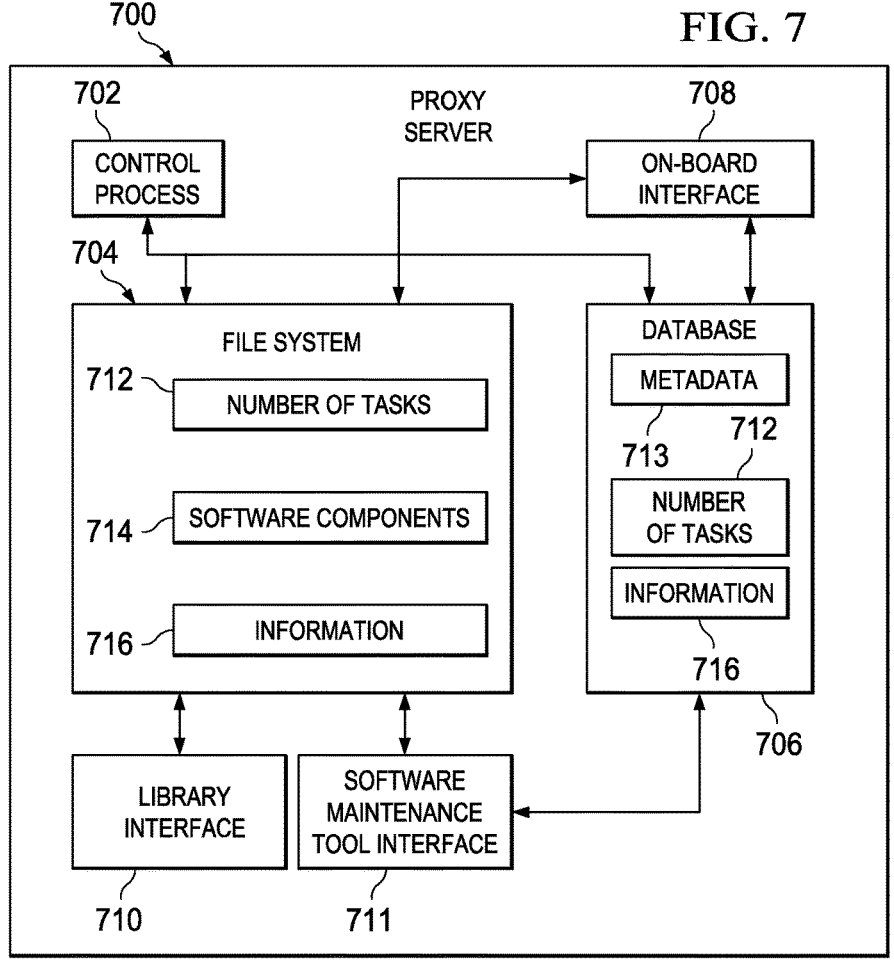
FIG. 7 is an illustration of a proxy server in accordance with an advantageous embodiment.

With reference now to FIG. 7, an illustration of a proxy server is depicted in accordance with an advantageous embodiment. In this illustrative example, proxy server 700 is an example of one implementation for proxy server 240 in FIG. 2. As depicted, proxy server 700 includes control process 702, file system 704, database 706, on-board interface 708, library interface 710, and software maintenance tool interface 711.

In this illustrative example, control process 702 is configured to perform and manage number of tasks 712. Number of tasks 712 may include, for example, operations for installing a software component in a ground vehicle, deleting a software component from the ground vehicle, and/or requesting information from the ground vehicle.

Number of tasks 712 is stored in at least one of file system 704 and database 706. Software components 714 and information 716 are stored in file system 704. Metadata 713 for number of tasks 712 is stored in database 706 by control process 702. This metadata may include, for example, an indication of whether a task has been completed. Further, the metadata is recorded in database 706. The task may be completed by proxy server 700 and/or by a ground vehicle.

Proxy server 700 communicates with an on-board application running on a computer in a ground vehicle using on-board interface 708. Proxy server 700 may send information to the ground vehicle and/or receive information from the ground vehicle.

For example, proxy server 700 may receive information from the ground vehicle using on-board interface 708. This information may include information about the tasks completed by the computer in the ground vehicle, performance data, maintenance data, and/or other suitable information. Further, proxy server 700 may send software components and a number of tasks to the ground vehicle using on-board interface 708.

In this illustrative example, proxy server 700 receives software components 714, number of tasks 712, and/or information 716 from a library application using library interface 710. Proxy server 700 is configured to receive this data from the library application in response to an event. The event may be, for example, a period of time elapsing. In this manner, proxy server 700 periodically retrieves software components 714, number of tasks 712, and/or information 716 for updating software components in the ground vehicle.

Additionally, proxy server 700 may be configured to send software components, tasks, and/or information to the ground vehicle in response to an event. This data is stored in file system 704 until the data is distributed to the ground vehicle through on-board interface 708. In some illustrative examples, proxy server 700 may be configured to send software components, tasks, and/or information to a selected group of ground vehicles. The group of ground vehicles may be selected based on a number of factors. These factors may include, for example, without limitation, make, model, year, type, and/or other suitable factors for the ground vehicles.

Further, in these illustrative examples, proxy server 700 is associated with a number of software maintenance tools. In other words, a number of software maintenance tools are registered within proxy server 700. Proxy server 700 sends software components, tasks, and/or information that have not yet been sent to the ground vehicle to the number of software maintenance tools using software maintenance tool interface 711. This data may be sent at the same time proxy server 700 retrieves data from the library application. If proxy server 700 distributes these software components and tasks to the ground vehicles and receives acknowledgement from these ground vehicles that the tasks have been performed, proxy server 700 removes the tasks from software maintenance tool interface 711.

Additionally, proxy server 700 receives information from ground vehicles using on-board interface 708. Proxy server 700 stores this information in at least one of information 716 in file system 704 and database 706.

In these depicted examples, proxy server 700 communicates with other software applications using wireless connections. Further, proxy server 700 does not require user input to distribute software components and tasks to the ground vehicle or to communicate with the other software applications. Further, user input is not required for control process 702 in proxy server 700 to perform and manage number of tasks 712.

In this illustrative example, data exchanged between proxy server 700 and other software applications is packaged in crates using a crate tool. For example, proxy server 700 may send software components packaged in a crate to a ground vehicle using on-board interface 708.

Figure 8:
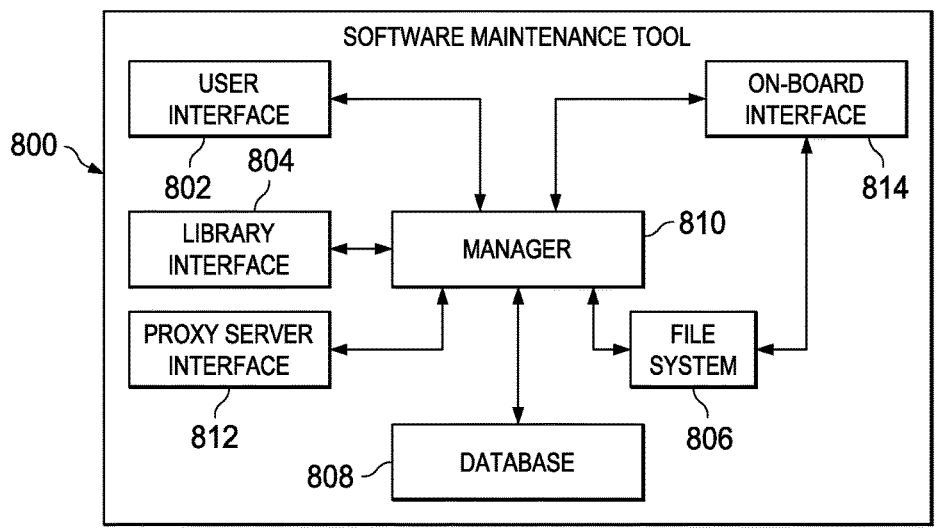
FIG. 8 is an illustration of a software maintenance tool in accordance with an advantageous embodiment.

With reference now to FIG. 8, an illustration of a software maintenance tool is depicted in accordance with an advantageous embodiment. In this illustrative example, software maintenance tool 800 is an example of one implementation for software maintenance tool 242 in FIG. 2. Software maintenance tool 800 runs on a portable computer in this illustrative example.

As depicted, software maintenance tool 800 includes user interface 802, library interface 804, file system 806, database 808, manager 810, proxy server interface 812, and on-board interface 814. User interface 802 allows an operator to operate software maintenance tool 800. In this manner, the operator may provide user input to control the distribution of software components and tasks by software maintenance tool 800.

Library interface 804 allows software maintenance tool 800 to receive software components, tasks, and/or information from a library application. The software components received from the library application are stored in file system 806. The tasks and information received from the library application are stored in database 808.

Further, database 808 stores metadata for the software components stored in file system 806 in this illustrative example. This metadata may include, for example, an indication of whether a task has been completed, an identification of a particular ground vehicle, an identification of a type of ground vehicle, an identification of a system within a ground vehicle, and/or other suitable information.

Manager 810 is configured to manage file system 806 and database 808. For example, manager 810 is configured to manage the storage and retrieval of information in and out of file system 806 and database 808 based on information received through user interface 802 and library interface 804. As one illustrative example, manager 810 receives tasks and information through library interface 804 for storage in database 808. Further, manager 810 is configured to perform tasks within the tasks stored in database 808.

Additionally, proxy server interface 812 allows software maintenance tool 800 to communicate with a proxy server to retrieve tasks and/or software components and send automobile information. Software maintenance tool 800 may be registered within a proxy server. The proxy server may send software components and tasks stored in database 808 and file system 806 that has not yet been sent to a ground vehicle using proxy server interface 812. Manager 810 sends information retrieved from on-board interface 814 to proxy server interface 812.

Software maintenance tool 800 may retrieve software components, tasks, and/or information from a proxy server using proxy server interface 812. Software maintenance tool 800 stores this data until the data is sent to the ground vehicle.

In this illustrative example, software maintenance tool 800 exchanges information with a ground vehicle using on-board interface 814. For example, software maintenance tool 800 sends software components associated with tasks stored in database 808 to manager 810. Manager 810 sends these software components and tasks to ground vehicles using on-board interface 814. Software maintenance tool 800 receives information from on-board interface 814 and stores the information in file system 806. Software maintenance tool 800 may also store information received from on-board interface 814 in database 808 using manager 810.

Communications between software maintenance tool 800 and other software applications may use wireless connections or wired connections in these illustrative examples.

Figure 9:
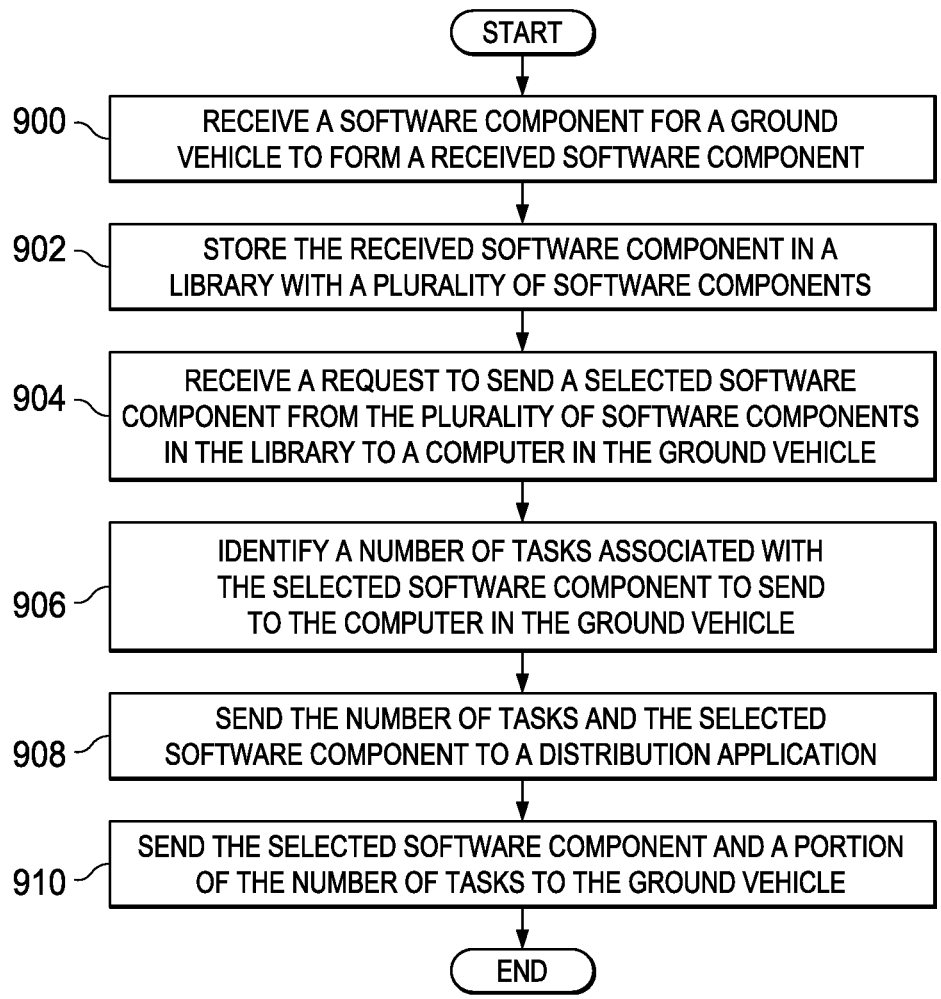
FIG. 9 is an illustration of a flowchart of a process for managing software components in ground vehicles in accordance with an advantageous embodiment.

With reference now to FIG. 9, an illustration of a flowchart of a process for managing software components in ground vehicles is depicted in accordance with an advantageous embodiment. The process illustrated in FIG. 9 may be implemented in information management environment 200 in FIG. 2.

The process begins receiving a software component for a ground vehicle to form a received software component (operation 900). The received software component is for updating software components in the ground vehicle. The process then stores the received software component in a library with a plurality of software components (operation 902).

Thereafter, the process receives a request to send a selected software component from the plurality of software components in the library to a computer in the ground vehicle (operation 904). Next, the process identifies a number of tasks associated with the selected software component to send to the computer in the ground vehicle (operation 906). In operation 906, the number of tasks identified may include, for example, without limitation, operations for installing the selected software component.

The process then sends the number of tasks and the selected software component to a distribution application (operation 908). Thereafter, the distribution application sends the selected software component and a portion of the number of tasks to the ground vehicle (operation 910), with the process terminating thereafter. The portion may be some, all, or none of the number of tasks in this illustrative example.

Figure 10:
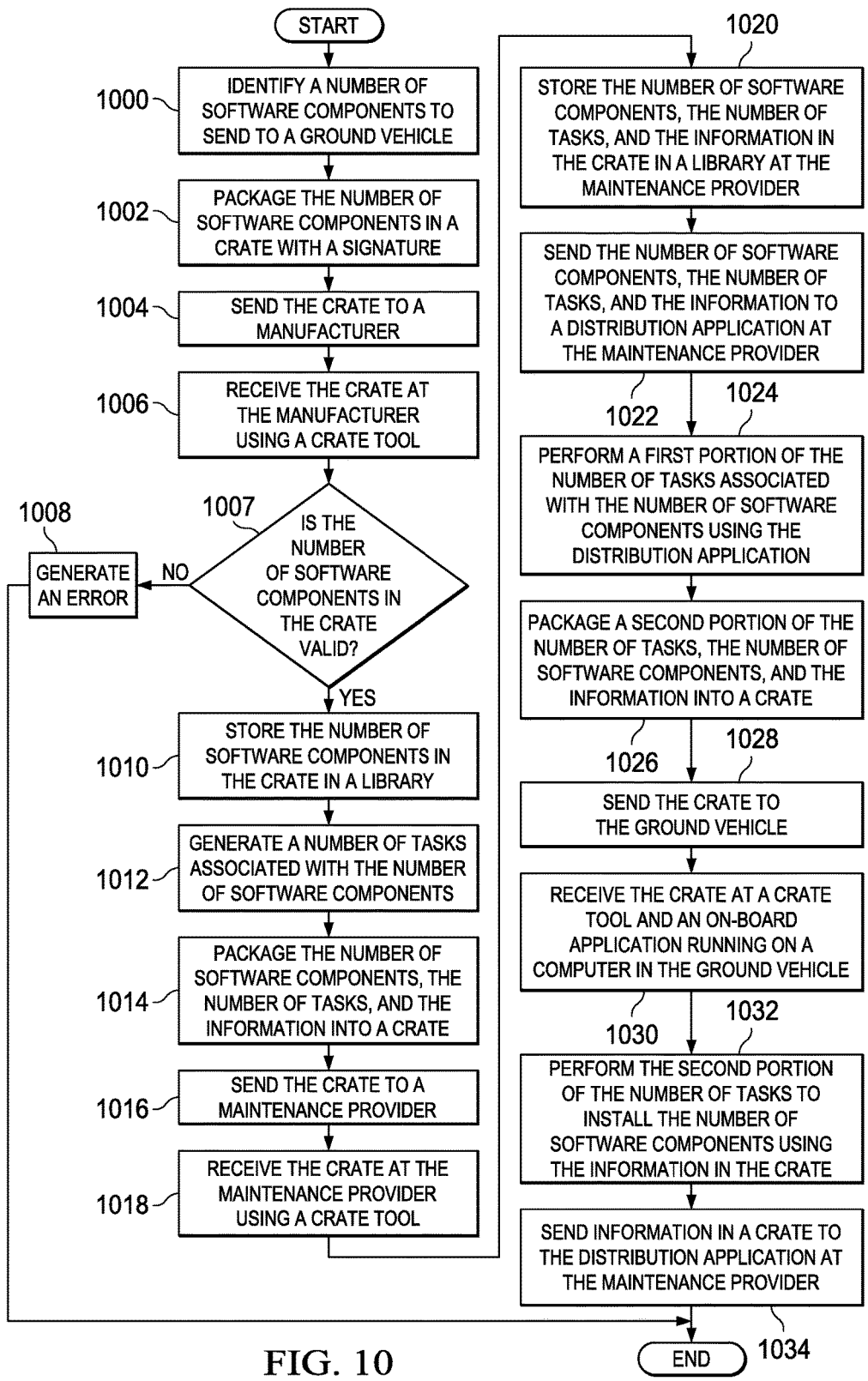
FIG. 10 is an illustration of a flowchart of a process for managing software components in ground vehicles in accordance with an advantageous embodiment.

With reference now to FIG. 10, an illustration of a flowchart of a process for managing software components in ground vehicles is depicted in accordance with an advantageous embodiment. The process illustrated in FIG. 10 may be implemented in information management environment 200 in FIG. 2.

The process begins with a software supplier identifying a number of software components to send to a ground vehicle (operation 1000). This number of software components is an update for systems in the ground vehicle. This update may include, for example, replacing a current software component with a newer software component, installing a software component not currently present on the ground vehicle, and/or other types of updates. In this illustrative example, the number of software components is to be installed on the ground vehicle.

The process then packages the number of software components in a crate with a signature (operation 1002). In other words, in operation 1002, the software supplier packages the number of software components in a crate and signs the crate.

Thereafter, the process sends the crate to a manufacturer (operation 1004). The process receives the crate at the manufacturer using a crate tool (operation 1006). The process determines whether the number of software components in the crate is valid (operation 1007). This determination is made by validating the signature in the crate and determining that changes have not been made to the number of software components since the signing of the crate.

If the number of components in the crate is not valid, the process generates an error (operation 1008), with the process terminating thereafter. Otherwise, if the number of components in the crate is valid, the process then stores the number of software components in the crate in a library (operation 1010). This library is managed by a library application at the manufacturer.

Thereafter, the process generates a number of tasks associated with the number of software components (operation 1012). In operation 1012, when the number of tasks is generated, the number of tasks is also stored in the library. Further, information needed to perform the number of tasks and/or other suitable information is also stored in the library.

Next, the process packages the number of software components, the number of tasks, and the information into a crate (operation 1014). Operation 1014 is performed using a crate tool at the manufacturer. The process sends the crate to a maintenance provider (operation 1016).

The process receives the crate at the maintenance provider using a crate tool (operation 1018). Thereafter, the process stores the number of software components, the number of tasks, and the information in the crate in a library at the maintenance provider (operation 1020). This library is managed by a library application at the maintenance provider.

Next, the process sends the number of software components, the number of tasks, and the information to a distribution application at the maintenance provider (operation 1022). The distribution application is used to distribute the number of software components, the number of tasks, and the information to the ground vehicle. For distributing this data using wireless connections and without user input, the distribution application takes the form of a proxy server. For distributing this data using wired or wireless connections based on operator input, the distribution application takes the form of a software maintenance tool.

The process then performs a first portion of the number of tasks associated with the number of software components using the distribution application (operation 1024). The process packages a second portion of the number of tasks, the number of software components, and the information into a crate (operation 1026). The second portion of the number of tasks includes operations that need to be performed by a computer in the ground vehicle.

Thereafter, the process sends the crate to the ground vehicle (operation 1028). The process then receives the crate at a crate tool and an on-board application running on a computer in the ground vehicle (operation 1030).

Next, the process performs the second portion of the number of tasks to install the number of software components using the information in the crate (operation 1032). Operation 1032 is performed by the on-board application in this illustrative example. The process then sends information in a crate to the distribution application at the maintenance provider (operation 1034), with the process terminating thereafter. This information includes, for example, a report for the number of tasks performed and an indication that the installation of the number of software components is complete.

Figure 11:
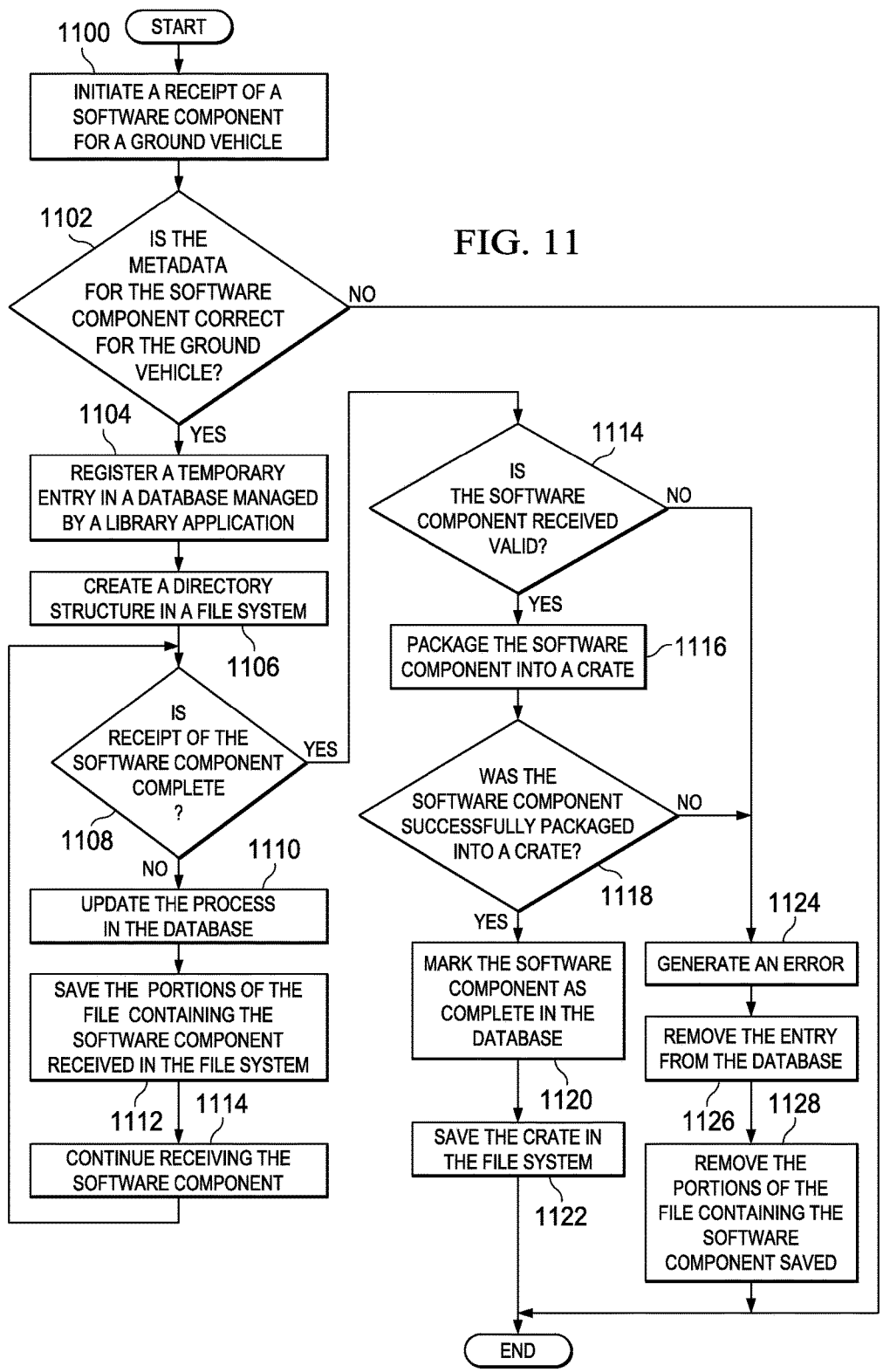
FIG. 11 is an illustration of a flowchart of a process for crating and storing software components for ground vehicles in accordance with an advantageous embodiment.

With reference now to FIG. 11, an illustration of a flowchart of a process for crating and storing software components for ground vehicles is depicted in accordance with an advantageous embodiment. The process illustrated in FIG. 11 may be implemented in information management environment 200 in FIG. 2. In particular, this process may be implemented using a library application, such as library application 216 in FIG. 2.

The process begins by initiating a receipt of a software component for a ground vehicle (operation 1100). In operation 1100, receipt of the software component includes receipt of metadata for the software component. The metadata may include, for example, without limitation, information identifying parameters for the ground vehicle. For example, the metadata may include a make, a model, a year, a system in the ground vehicle for the software component, and/or other suitable information identifying the ground vehicle to which the software component is to be sent.

The process determines whether the metadata for the software component is correct for the ground vehicle (operation 1102). If the metadata is not correct, the process terminates. Otherwise, the process registers a temporary entry in a database managed by a library application (operation 1104). The database may be stored in a library in this illustrative example. This temporary entry is used to provide a status of the process for receiving the software component. The entry initially indicates that the receiving of the software component has begun.

The process creates a directory structure in a file system (operation 1106). The directory structure is created to save portions of the file containing the software component.

Thereafter, the process determines whether receipt of the software component is complete (operation 1108). If receipt of the software component is not complete, the process updates the process in the database (operation 1110). In some illustrative examples, this progress may be displayed in a user interface. The process saves the portions of the file containing the software component received in the file system (operation 1112). Next, the process continues receiving the software component (operation 1114), with the process then returning to operation 1108 as described above.

With reference again to operation 1108, if receipt of the software component is complete, the process determines whether the software component received is valid (operation 1114). This determination is made by checking that the stated source of the software component matches a signature for the software component. In some illustrative examples, a certificate may be matched to the software component. Further, in operation 1114, the software component received is valid if changes have not been made to the software component since the signing of the software component.

If the software component received is valid, the process packages the software component into a crate (operation 1116). Operation 1116 is performed using a crate tool. The process then determines whether the software component was successfully packaged into a crate (operation 1118). If the software component is successfully packaged into the crate, the process marks the software component as complete in the database (operation 1120). The process then saves the crate in the file system (operation 1122), with the process terminating thereafter.

However, if the package is not successfully packaged into the crate, the process generates an error (operation 1124). The process then removes the entry from the database (operation 1126). Next, the process removes the portions of the file containing the software component saved (operation 1128), with the process terminating thereafter.

Figure 12:
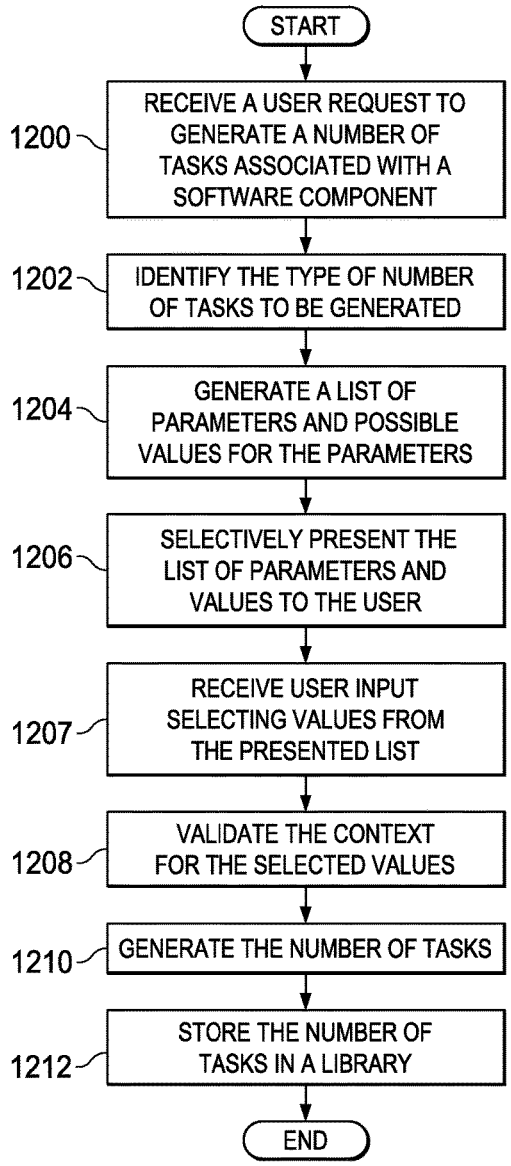
FIG. 12 is an illustration of flowchart of a process for generating a number of tasks in accordance with an advantageous embodiment.

With reference now to FIG. 12, an illustration of a flowchart of a process for generating a number of tasks is depicted in accordance with an advantageous embodiment. The process illustrated in FIG. 12 may be implemented in information management environment 200 in FIG. 2. In particular, this process may be implemented using a library application, such as library application 216 in FIG. 2.

The process begins by receiving a user request to generate a number of tasks associated with a software component (operation 1200). For example, a number of tasks may be generated for each registered vehicle matching criteria specified in the user request. Then, the process identifies the type of number of tasks to be generated (operation 1202). For example, the type of number of tasks may be for an installation of a software component in a ground vehicle, a replacement of a current software component in a ground vehicle with a new software component, or a removal of an outdated software component.

Thereafter, the process generates a list of parameters and possible values for the parameters (operation 1204). This list of parameters includes, for example, model numbers for a ground vehicle, makes for a ground vehicle, model years for a ground vehicle, types of ground vehicles, names of ground vehicles, and/or other suitable information.

The process selectively presents the list of parameters and values to the user (operation 1206). In operation 1206, the list presented is a context-sensitive list that provides additional options or values, depending on the previous selections made by the user.

Next, the process receives user input selecting values from the presented list (operation 1207). The process then validates the context for the selected values (operation 1208). In operation 1208, the selected values are checked in a user interface system that implements what is allowable within the type for the number of tasks to be generated. Additionally, operation 1208 may also be performed using a policy containing a set of rules for the parameter values based on the type for the number of tasks to be generated.

Thereafter, the process generates the number of tasks (operation 1210). The process then stores the number of tasks in a library (operation 1212), with the process terminating thereafter.

Figure 13:
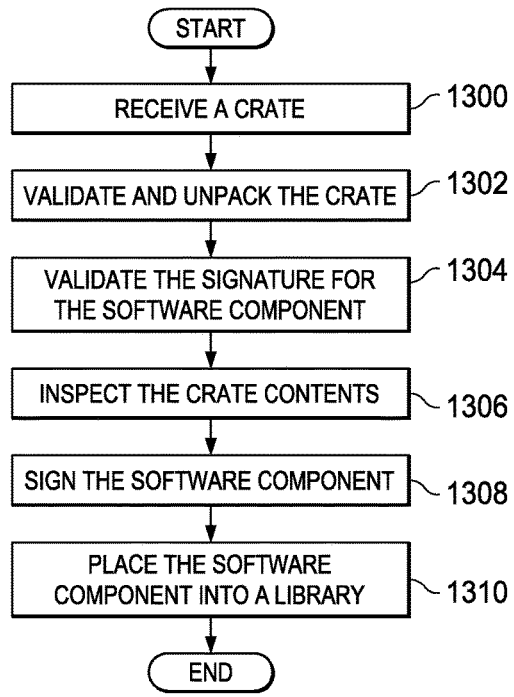
FIG. 13 is an illustration of a flowchart of a process for receiving and storing software components in accordance with an advantageous embodiment.

Turning now to FIG. 13, an illustration of a process for receiving and storing software components is depicted in accordance with an advantageous embodiment. The process illustrated in FIG. 13 may be implemented in information management environment 200 in FIG. 2. In particular, this process may be implemented using crate tool 220 in FIG. 2.

The process begins with a crate tool receiving a crate (operation 1300). This tool may be, for example, crate tool 220 in FIG. 2. In this example, the crate contains a software component. The software component may be received in response to a notification of the availability of the software component and delivered through some transport mechanism. The crate may be received on a physical or tangible media, such as a compact disk, flash memory, or digital versatile disk. In other embodiments, the crate may be received through a transmission media, such as a communications link over a network.

The crate tool validates and unpacks the crate (operation 1302). In this operation, a notification is generated if the signature is invalid. If no problems are detected, the crate is unpacked into various locations for additional processing. Next, the crate tool validates the signature for the software component (operation 1304). This signature may be the signature for the software supplier. If the signature is invalid, a notification is generated. If no problems are detected, the software component is now ready to be signed after the contents of the crate have been validated or verified.

The crate tool then inspects the crate contents (operation 1306). In this operation, the contents of the crate may be displayed for a user to verify the contents. In other embodiments, this operation may be performed automatically for a comparison of the contents with a file or configuration information identifying the expected contents of the crate.

Once the contents have been verified, the crate tool signs the software component (operation 1308). This signature may be the signature of the software supplier, the manufacturer, maintenance provider, and/or the ground vehicle, depending on the implementation. If no errors occur in signing the software part, the part is ready for storage.

Thereafter, the crate tool places the software component into a library (operation 1310), with the process terminating thereafter. This operation involves moving the software component from its current location on the file system to the storage area for the library containing the different software components. In these examples, this library may be, for example, library 222 in FIG. 2.

Figure 14:
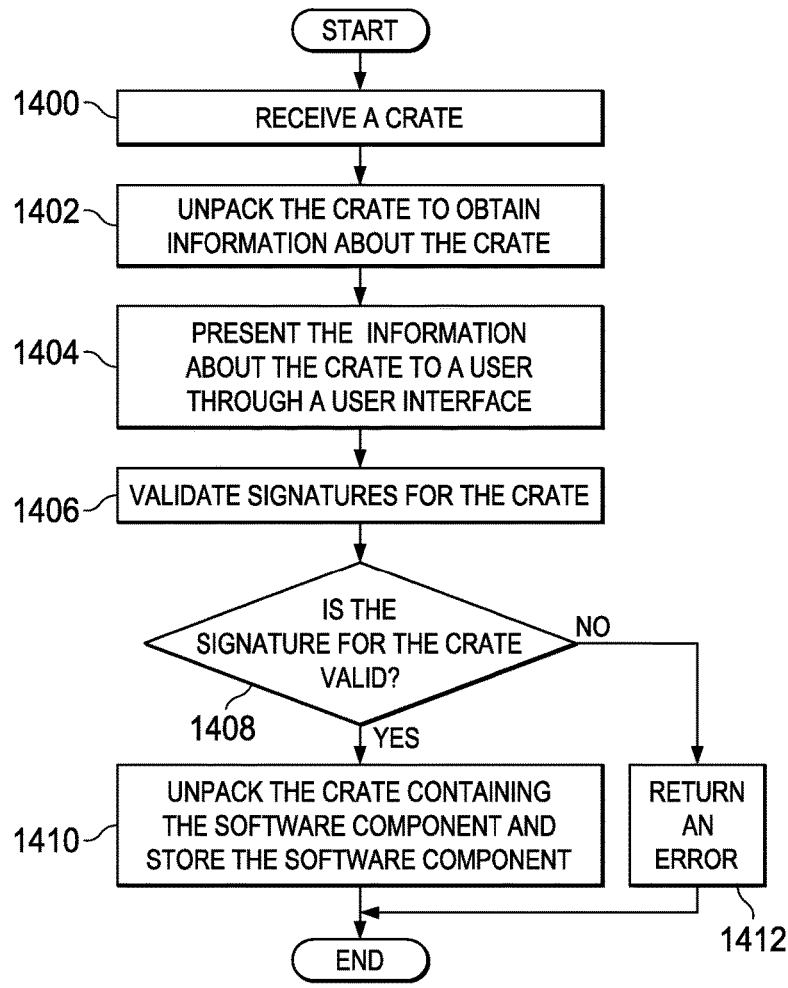
FIG. 14 is an illustration of a flowchart of a process for sending information from a library application to a distribution application in accordance with an advantageous embodiment.

With reference now to FIG. 14, an illustration of a flowchart of a process for sending information from a library application to a distribution application is depicted in accordance with an advantageous embodiment. The process illustrated in FIG. 14 may be implemented in information management environment 200 in FIG. 2. In particular, this process may be implemented using crate tool 220 in FIG. 2. Further, this process may be implemented to perform, for example, operations 1302 and 1304 in FIG. 13.

The process begins by receiving a crate (operation 1400). In this example, the crate may be received through various sources. For example, a physical media may be connected to or placed into the data processing system in which the process executes. In other embodiments, the crate may be received through a communications link, such as a network link. The process then unpacks the crate to obtain information about the crate (operation 1402). This information may include, for example, signatures for the crate.

Thereafter, the process presents the information about the crate to a user through a user interface (operation 1404). In this operation, the information may be presented through a graphical user interface. This information may include, for example, the manufacturer source of the crate, an identification of the contents in the crate, a size of the crate, and/or other suitable information.

The process then validates signatures for the crate (operation 1406). In these examples, the signatures may be signed using a private key. A public key located in a distribution application may be used to determine whether the manifest and file digests are valid. This validation also is used to determine whether the crate actually has been originated by the source and remains unaltered and unchanged.

A determination is made as to whether the signature for the crate is valid (operation 1408). If the crate signature is valid, the process unpacks the crate containing the software component and stores the software component (operation 1410). In operation 1410, the software component may be stored in the library or file system.

The signature may not need to be valid to unpack the crate. User input may determine whether or not to continue unpacking the crate if one or more invalid items in the signature are detected. In these examples, if the crate signature is valid, the software component is unpacked and stored within a library or file system as described in operation 1410. The process terminates thereafter.

With reference again to operation 1408, if the crate signature is not valid, an error is returned (operation 1412), with the process terminating thereafter.

Figure 15:
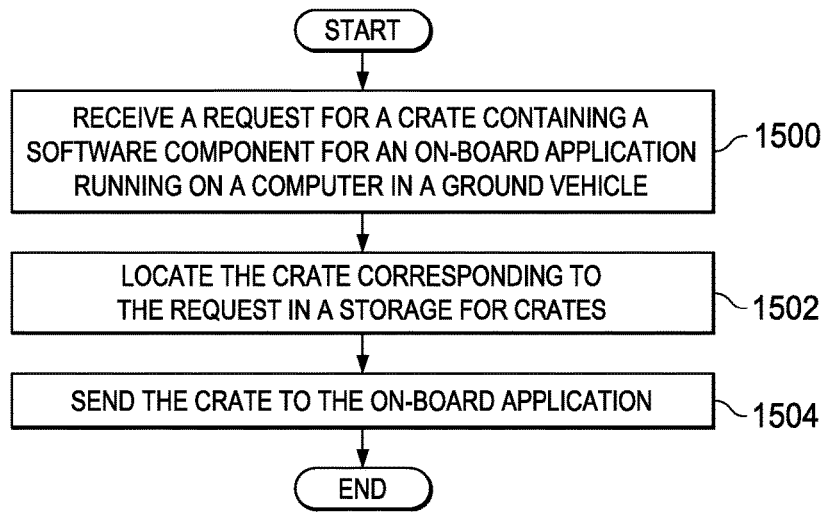
FIG. 15 is an illustration of a flowchart of a process for sending a crate to an on-board application using a distribution application in accordance with an advantageous embodiment.

Turning now to FIG. 15, an illustration of a flowchart of a process for sending a crate to an on-board application is depicted in accordance with an advantageous embodiment. The process illustrated in FIG. 15 may be implemented in information management environment 200 in FIG. 2. In particular, this process may be implemented using crate tool 220 in FIG. 2.

The process begins by receiving a request for a crate containing a software component for an on-board application running on a computer in a ground vehicle (operation 1500). For example, the maintenance provider or the owner of the ground vehicle may initiate an update process in the computer in the ground vehicle. The update process may be to update a particular system for the ground vehicle. The owner may initiate the update process by making a selection of the update process through a user interface associated with the computer in the ground vehicle.

The process may then locate the crate corresponding to the request in a storage for crates (operation 1502). Thereafter, the process sends the crate to the on-board application (operation 1504), with the process terminating thereafter.

In this manner, software components may be sent to a ground vehicle at the request of an owner of the ground vehicle. In other illustrative examples, the request for the crate containing the software component may be an automated request received periodically from the on-board application.

Figure 16:
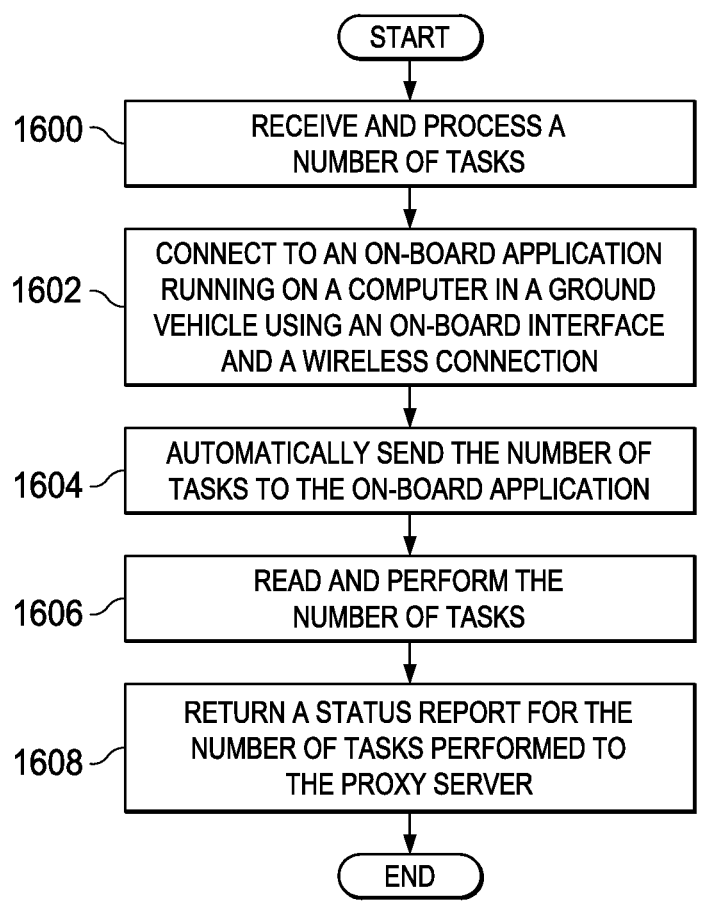
FIG. 16 is an illustration of a flowchart of a process for distributing a number of tasks using a proxy server in accordance with an advantageous embodiment.

With reference now to FIG. 16, an illustration of a flowchart of a process for distributing a number of tasks using a proxy server is depicted in accordance with an advantageous embodiment. The process illustrated in FIG. 16 may be implemented in information management environment 200 in FIG. 2. In particular, this process may be implemented using proxy server 240 and on-board application 250 in FIG. 2.

The process begins with the proxy server receiving and processing a number of tasks (operation 1600). The proxy server then connects to an on-board application running on a computer in a ground vehicle using an on-board interface and a wireless connection (operation 1602).

Next, the proxy server automatically sends the number of tasks to the on-board application (operation 1604). The on-board application reads and performs the number of tasks (operation 1606). The on-board application returns a status report for the number of tasks performed to the proxy server (operation 1608), with the process terminating thereafter.

Figure 17:
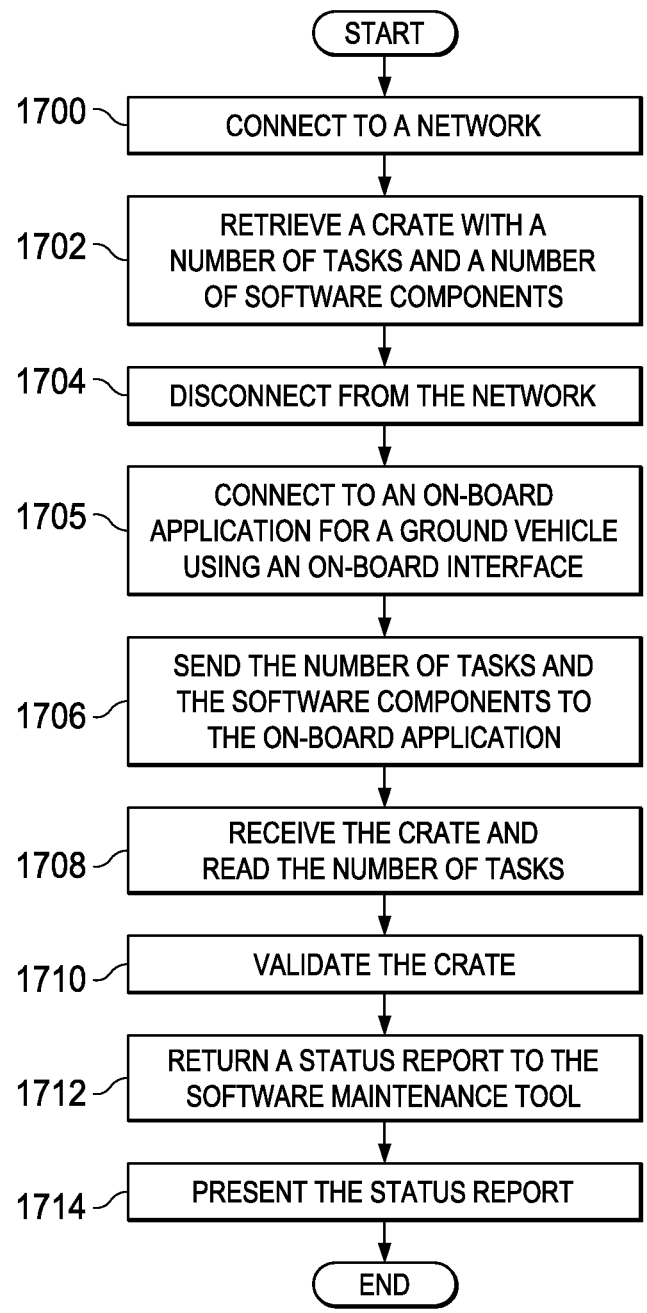
FIG. 17 is an illustration of a process for distributing a number of tasks using a software maintenance tool in accordance with an advantageous embodiment.

With reference to FIG. 17, an illustration of a process for distributing a number of tasks using a software maintenance tool is depicted in accordance with an advantageous embodiment. The process illustrated in FIG. 17 may be implemented in information management environment 200 in FIG. 2. In particular, this process may be implemented using software maintenance tool 242 and on-board application 250 in FIG. 2.

The process begins by the software maintenance tool connecting to a network (operation 1700). This network may be a wireless or wired network. Further, this network may be the network for a library application and a distribution application. The software maintenance tool retrieves a crate with a number of tasks and a number of software components (operation 1702). The software maintenance tool then disconnects from the network (operation 1704).

The software maintenance tool connects to an on-board application for a ground vehicle using an on-board interface (operation 1705). Thereafter, the software maintenance tool sends the number of tasks and the software components to the on-board application (operation 1706).

The on-board application receives the crate and reads the number of tasks (operation 1708). Next, the on-board application validates the crate (operation 1710). Thereafter, the on-board application returns a status report to the software maintenance tool (operation 1712). The software maintenance tool presents the status report (operation 1714), with the process terminating thereafter. In operation 1714, the status report may be presented to a user through a user interface. In some illustrative examples, the data in the status report may be saved in a database in operation 1714.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the different advantageous embodiments provide a more reliable and more secure system for managing software components in ground vehicles, such as automobiles. In one advantageous embodiment, an apparatus comprises a computer system, a library application, and a distribution application. The library application and the distribution application run on the computer system. The library application is configured to store a number of software components for use in ground vehicles in the computer system. The library application is also configured to generate tasks to manage software components in ground vehicles. The distribution application is configured to send a selected software component in the number of software components in the library to a ground vehicle.

The different advantageous embodiments can take the form of an entirely hardware embodiment, an entirely software embodiment, or an embodiment containing both hardware and software elements. Some embodiments are implemented in software, which includes, but is not limited to, forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories, which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems, remote printers, or storage devices through intervening private or public networks. Non-limiting examples are modems and network adapters and are just a few of the currently available types of communications adapters.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a computer system, wherein the computer system is located off of a ground vehicle;
   a library application running on the computer system, wherein the library application is configured to
      store a number of software components for ground vehicles in the computer system and generate tasks to manage software components in the ground vehicles, wherein the tasks comprise commands for controlling computers on the ground vehicles for installing the number of software components on the ground vehicles;
   a distribution application running on the computer system, wherein the distribution application is configured to
      send a selected software component in the number of software components and a number of tasks to the ground vehicle to control a computer in the ground vehicle to install the selected software component on the ground vehicle; and
   a crate tool in the computer system off of the ground vehicle configured to
      validate signatures associated with first crates, wherein the first crates contain the number of software components and the number of tasks.

2. The apparatus of claim 1, wherein the number of tasks, when performed by the computer, causes the computer in the ground vehicle to perform one of deleting a current software component, installing the selected software component, deleting the current software component and installing the selected software component, and sending information about the ground vehicle to the distribution application.

3. The apparatus of claim 1 further comprising:
   an on-board application running on the computer in the ground vehicle, wherein the on-board application is configured to receive the selected software component sent from the distribution application and perform the number of tasks received from the distribution application.

4. The apparatus of claim 3, wherein the on-board application is further configured to send information generated by the computer in the ground vehicle to the distribution application.

5. The apparatus of claim 4, wherein the library application is configured to store the information received from the on-board application running on the computer in the ground vehicle.

6. The apparatus of claim 4, wherein the on-board application running on the computer in the ground vehicle is configured to send and receive the information to and from another ground vehicle.

7. The apparatus of claim 1, wherein the distribution application runs on a portion of the computer system located at one of a manufacturer and a maintenance provider.

8. The apparatus of claim 1, wherein the distribution application is selected from a group comprising a proxy server application and a software maintenance tool.

9. The apparatus of claim 1, wherein the distribution application is a software maintenance tool and further comprising:
   a portable computer in the computer system off of the ground vehicle configured to run the software maintenance tool.

10. The apparatus of claim 1 further comprising:
    another crate tool in the computer in the ground vehicle, wherein the another crate tool is configured to manage crates containing at least one of the software components and information generated by the computer in the ground vehicle, sign the at least one of the software components and the information, and validate signatures for the at least one of the software components and the information.

11. The apparatus of claim 1 further comprising:
    the crate tool in the computer system off of the ground vehicle, wherein the crate tool is configured to manage crates containing the software components.

12. The apparatus of claim 11, wherein the crate tool in the computer system off of the ground vehicle is configured to remove a software component from a crate and place the software component in a library managed by the library application.

13. The apparatus of claim 11, wherein the crate tool in the computer system off of the ground vehicle is further configured to sign the software components and validate signatures for the software components signed.

14. The apparatus of claim 1, wherein the ground vehicle is selected from a group comprising a tracked vehicle, a truck, a train, a sport utility vehicle, a bus, and a van.

15. The apparatus of claim 1, wherein a software component in the number of software components is selected from a group comprising a program, a patch, a configuration file, and a script.

16. An apparatus comprising:
    a computer system, wherein the computer system is located off of a ground vehicle;
    a library application running on the computer system, wherein the library application is configured to store a number of software components and information for ground vehicles in the computer system and generate tasks to manage software components and the information in the ground vehicles, wherein the tasks comprise commands to install the number of software components on the ground vehicles;
    a distribution application running on the computer system, wherein the distribution application is configured to send a selected software component in the number of software components and a number of the tasks to the ground vehicle to install the selected software component on the ground vehicle and receive the information from the ground vehicle; and
    a crate tool in the computer system off of the ground vehicle, wherein the crate tool is configured to manage crates containing the software components and the information and to validate signatures associated with the software components and the information in the crates, wherein the selected software component and the number of the tasks to install the selected software component on the ground vehicle are contained in one crate in the crates.

17. A method for managing software components in ground vehicles, the method comprising:
    storing a number of software components in a computer system having a library application and a distribution application, wherein the library application is configured to store the number of software components for the ground vehicles in the computer system and generate tasks to manage the software components in the ground vehicles, wherein the computer system is located off of a ground vehicle and wherein the tasks comprise commands for controlling computers on the ground vehicles for installing the number of software components on the ground vehicles;

sending a number of the tasks and a selected software component in the number of software components to the ground vehicle using the distribution application to control a computer for the ground vehicle to install the selected software component in the ground vehicle; and validating signatures associated with crates by a crate tool in the computer system off of the ground vehicle, wherein the crates contain the number of software components and the tasks.

18. The method of claim 17 further comprising:

processing the number of tasks in the computer for the ground vehicle to install the selected software component in the ground vehicle.

19. The apparatus of claim 6, wherein the first crates are each received from a manufacturer of the ground vehicle and the selected software component was received via a first crate; and wherein the distribution application is further configured to package the selected software component from the first crate into a second crate and send the selected software component to the ground vehicle via the second crate.

20. The apparatus of claim 19, wherein the signatures associated with the first crates are from the manufacturer.

21. The apparatus of claim 20, wherein the selected software component was identified by a software supplier to be sent to the ground vehicle;

wherein the selected software component was packaged in a third crate with a signature of the software supplier;

wherein the manufacturer generates the number of tasks;

wherein the first crate is received form the manufacturer by a maintenance provider of the ground vehicle;

wherein the library application runs at the maintenance provider;

wherein the distribution application runs at the maintenance provider;

wherein the distribution performs a first portion of the number of tasks;

wherein a second portion of the number of tasks and the selected software component are packaged into the second crate;

wherein an on-board application on the ground vehicle performs the second portion of the number of tasks; and wherein the information includes a report for the number of tasks performed and an indication that installation of the selected software component is complete and the information is sent in a fourth crate to the distribution application at the maintenance provider.

* * * * *